(12) United States Patent
Park

(10) Patent No.: US 12,088,420 B2
(45) Date of Patent: Sep. 10, 2024

(54) CONFIGURATION AND APPLICATION OF SIDELINK IDENTIFICATION IN WIRELESS COMMUNICATION SYSTEM

(71) Applicant: Innovative Technology Lab Co., Ltd., Seoul (KR)

(72) Inventor: Dong Hyun Park, Seoul (KR)

(73) Assignee: Innovative Technology Lab Co., Ltd., Seoul (KR)

( * ) Notice: Subject to any disclaimer, the term of this patent is extended or adjusted under 35 U.S.C. 154(b) by 424 days.

(21) Appl. No.: 17/373,187

(22) Filed: Jul. 12, 2021

(65) Prior Publication Data

US 2021/0344460 A1   Nov. 4, 2021

Related U.S. Application Data

(63) Continuation of application No. PCT/KR2020/000346, filed on Jan. 8, 2020.

(30) Foreign Application Priority Data

Jan. 11, 2019  (KR) .................. 10-2019-0004206
Jan. 7, 2020   (KR) .................. 10-2020-0002088

(51) Int. Cl.
  *H04W 72/20*    (2023.01)
  *H04L 1/1812*   (2023.01)
  (Continued)

(52) U.S. Cl.
  CPC .......... *H04L 1/1896* (2013.01); *H04L 1/1819* (2013.01); *H04W 72/0446* (2013.01); *H04W 72/20* (2023.01); *H04W 92/18* (2013.01)

(58) Field of Classification Search
  CPC ..... H04L 1/1812; H04L 47/50; H04L 12/863; H04L 5/0053; H04L 5/0055;
  (Continued)

(56) References Cited

U.S. PATENT DOCUMENTS

2013/0179570 A1\* 7/2013 Goldburg ................ G06F 9/541
                                                    709/225
2016/0128093 A1\* 5/2016 Lee ........................ H04W 72/23
                                                    370/329
(Continued)

FOREIGN PATENT DOCUMENTS

EP      3273634 A1    1/2018
JP    2012080259 A    4/2012
(Continued)

OTHER PUBLICATIONS

3rd Generation Partnership Project; Technical Specification Group Radio Access Network; NR; Study on Vehicle-to-Everything (Release 16), 3GPP TR 38.885 V1.0.0, Nov. 2018, pp. 1-23.

(Continued)

*Primary Examiner* — Nathan S Taylor

(57) ABSTRACT

According to an aspect of the present disclosure, there is provided a method of transmitting feedback information from a user equipment (UE) in a new radio (NR) vehicle-to-everything (V2X) system. Here, the method of transmitting feedback information may include performing, by a first UE and a second UE, a session establishment process based on at least one of unicast and groupcast; exchanging, by the first UE and the second UE, ID information in the session establishment process; and completing, by the first UE and the second UE, the session establishment. Here, when the first UE and the second UE complete the session establishment, a physical layer ID representing a session may be determined.

20 Claims, 15 Drawing Sheets

(51) Int. Cl.
*H04L 1/1867* (2023.01)
*H04W 72/0446* (2023.01)
*H04W 92/18* (2009.01)

(58) Field of Classification Search
CPC . H04L 1/1861; H04L 1/1864; H04L 12/1863; H04L 2001/0093; H04L 1/1607; H04L 12/18; H04L 1/16; H04L 1/18; H04L 5/00; H04L 1/1819; H04L 1/1829; H04L 1/1854; H04L 1/1896; H04W 52/365; H04W 72/12; H04W 28/0252; H04W 28/0263; H04W 28/0278; H04W 72/0413; H04W 72/1221; H04W 72/1263; H04W 76/15; H04W 88/00; H04W 88/085; H04W 72/04; H04W 76/00; H04W 24/08; H04W 72/0446; H04W 72/0453; H04W 72/20; H04W 4/40; H04W 76/11; H04W 76/14; H04W 92/18; H04W 76/40
See application file for complete search history.

(56) References Cited

U.S. PATENT DOCUMENTS

| | | | | |
|---|---|---|---|---|
| 2016/0219132 | A1* | 7/2016 | Lee | H04L 69/22 |
| 2018/0139724 | A1* | 5/2018 | Loehr | H04W 72/02 |
| 2018/0263026 | A1* | 9/2018 | Loehr | H04W 72/20 |
| 2019/0053251 | A1* | 2/2019 | Loehr | H04W 72/1263 |
| 2019/0124015 | A1* | 4/2019 | Loehr | H04L 5/0058 |
| 2019/0182840 | A1* | 6/2019 | Feng | H04W 74/0816 |
| 2019/0268918 | A1* | 8/2019 | Baghel | H04W 4/40 |
| 2019/0313375 | A1* | 10/2019 | Loehr | H04W 72/04 |
| 2020/0195389 | A1* | 6/2020 | Basu Mallick | H04W 4/70 |
| 2021/0076257 | A1* | 3/2021 | Pocha | H04W 76/12 |
| 2021/0288778 | A1* | 9/2021 | Park | H04L 1/1858 |
| 2021/0306824 | A1* | 9/2021 | Li | H04W 4/40 |
| 2022/0416978 | A1* | 12/2022 | Kalbasi | H04L 5/0053 |

FOREIGN PATENT DOCUMENTS

| | | | |
|---|---|---|---|
| KR | 20150094622 A | 8/2015 | |
| WO | 2004107671 A1 | 12/2004 | |
| WO | 2018016157 A1 | 1/2018 | |
| WO | 2018233484 A1 | 12/2018 | |
| WO | WO-2020145666 A1 * | 7/2020 | ........... H04L 1/1819 |

OTHER PUBLICATIONS

Examination report under sections 12 & 13 of the Patents Act, 1970 and the Patents Rules, 2003 for Application No. 202117034215, from Intellectual Property India. Dated Aug. 25, 2022.
International Search Report for International Patent Application No. PCT/KR2020/000346, dated May 4, 2020.
Written Opinion for International Patent Application No. PCT/KR2020/000346, dated May 4, 2020.
"3rd Generation Partnership Project; Technical Specification Group Radio Access Network; NR; Physical channels and modulation (Release 15)", 3GPP TS 38.211 V15.3.0, Sep. 2018, pp. 1-96, 3GPP Organizational Partners.
"3rd Generation Partnership Project; Technical Specification Group Radio Access Network; NR; Physical layer procedures for control (Release 15)", 3GPP TS 38.213 V15.3.0, Sep. 2018, pp. 1-96, 3GPP Organizational Partners.
"3rd Generation Partnership Project; Technical Specification Group Radio Access Network; NR; Physical layer procedures for data (Release 15)", 3GPP TS 38.214 V15.3.0, Sep. 2018, pp. 1-96, 3GPP Organizational Partners.
"3rd Generation Partnership Project; Technical Specification Group Radio Access Network; NR; NR and NG-RAN Overall Description; Stage 2 (Release 15)", 3GPP TS 38.300 V15.3.1, Oct. 2018, pp. 1-92, 3GPP Organizational Partners.
3rd Generation Partnership Project; Technical Specification Group Radio Access Network; NR; Requirements for support of radio resource management(Release 15); 3GPP TS 38.133 V15.3.0 (Sep. 2018); pp. 1-136.
3rd Generation Partnership Project; Technical Specification Group Radio Access Network; Evolved Universal Terrestrial Radio Access (E-UTRA); Layer 2—Measurements(Release 15); 3GPP TS 36.314 V15.1.0 (Jul. 2018); pp. 1-28.

* cited by examiner (a)

(b)

CONFIGURATION AND APPLICATION OF SIDELINK IDENTIFICATION IN WIRELESS COMMUNICATION SYSTEM

CROSS-REFERENCE TO RELATED APPLICATIONS

This application is a continuation of pending PCT International patent application No. PCT/KR2020/000346, filed on Jan. 8, 2020, which claims priority from and the benefit of Korean Patent Application No. 10-2019-0004206, filed with the Korean Intellectual Property Office on Jan. 11, 2019, and Korean Patent Application No. 10-2020-0002088, filed with the Korean Intellectual Property Office on Jan. 7, 2020, each of which is hereby incorporated by reference in its entirety.

BACKGROUND

1. Field

The present disclosure relates to a method and apparatus in a wireless communication system.

2. Discussion of the Background

International Mobile Telecommunication (IMT) framework and standard are being developed in the International Telecommunication Union (ITU). Also, in the recent times, discussion for 5-th generation (5G) communication is ongoing through a program called "IMT for 2020 and beyond".

To meet the requirements requested by "IMT for 2020 and beyond", discussion is being made to support various numerologies about a time-frequency resource unit standard by considering various scenarios, service requirements, and potential system compatibility in a 3-rd Generation Partnership Project (3GPP) new radio (NR) system.

Vehicle-to-everything (V2X) communication refers to a communication method of exchanging or sharing road infrastructures during driving and information, such as traffic conditions, through communication with other vehicles. V2X may include, for example, vehicle-to-vehicle (V2V) that refers to long term evolution (LTE)-based communication between vehicles, vehicle-to-pedestrian (V2P) that refers to LTE-based communication between a vehicle and a user equipment (UE) carried by a user, and vehicle-to-infrastructure/network (V2I/N) that refers to LTE-based communication between a vehicle and a roadside unit (RSU)/network. Here, the RSU may be a transportation infrastructure entity configured by a base station or a fixed terminal, such as, for example, an entity that transmits a speed notification to a vehicle.

SUMMARY

An aspect of the present disclosure provides a method and apparatus that may determine a physical layer session identification (ID) in a wireless communication system.

An aspect of the present disclosure also provides a method and apparatus that may determine a physical layer session ID in a new radio (NR) vehicle-to-everything (V2X) system.

An aspect of the present disclosure provides a method and apparatus that may determine a physical layer session ID to perform sidelink communication according to quality of service (QoS) requirements in an NR V2X system.

An aspect of the present disclosure provides a method and apparatus that may determine a Physical Sidelink Feedback Channel (PSFCH) format in an NR V2X system.

An aspect of the present disclosure provides a method and apparatus that may determine a PSFCH structure in an NR V2X system.

According to an aspect of the present disclosure, there is provided a method of transmitting feedback information from a user equipment (UE) in a new radio (NR) vehicle-to-everything (V2X) system. Here, the method of transmitting feedback information may include performing, by a first UE and a second UE, a session establishment process based on at least one of unicast and groupcast; exchanging, by the first UE and the second UE, ID information in the session establishment process; and completing, by the first UE and the second UE, the session establishment. Here, when the first UE and the second UE complete the session establishment, a physical layer ID representing a session may be determined.

According to the present disclosure, it is possible to determine a physical layer session identification (ID) in a wireless communication system.

According to the present disclosure, it is possible to determine a physical layer session ID in a new radio (NR) vehicle-to-everything (V2X) system.

According to the present disclosure, it is possible to determine a physical layer session ID to perform sidelink communication according to quality of service (QoS) requirements in an NR V2X system.

According to the present disclosure, it is possible to determine a Physical Sidelink Feedback Channel (PSFCH) format in an NR V2X system.

An aspect of the present disclosure, it is possible to determine a PSFCH structure in an NR V2X system.

The features briefly described above with respect to the present disclosure are some aspects of the detailed description of this disclosure and are not provided to limit the scope of the disclosure.

DETAILED DESCRIPTION

Figure 1:
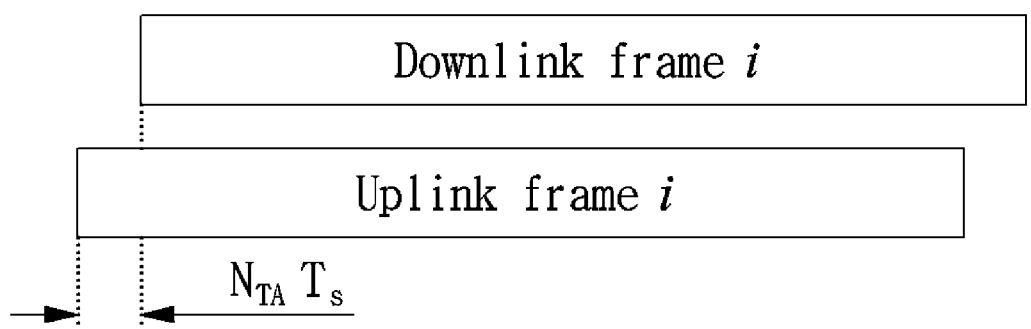
FIG. 1 illustrates an example of a frame structure for downlink/uplink transmission according to an embodiment of the present disclosure.

To achieve the purpose, according to an aspect of the present disclosure, there is provided a method of transmitting feedback information from a user equipment (UE) in a new radio (NR) vehicle-to-everything (V2X) system. Here, the method of transmitting feedback information may include performing, by a first UE and a second UE, a session establishment process based on at least one of unicast and groupcast; exchanging, by the first UE and the second UE, ID information in the session establishment process; and completing, by the first UE and the second UE, the session establishment. Here, when the first UE and the second UE complete the session establishment, a physical layer ID representing a session may be determined.

Various examples of the present disclosure will be described more fully hereinafter with reference to the accompanying drawings such that one of ordinary skill in the art to which the present invention pertains may easily implement the examples. However, the present disclosure may be implemented in various forms and is not limited to the examples described herein.

In describing the examples of the present disclosure, detailed description on known configurations or functions may be omitted for clarity and conciseness. Throughout the drawings and the detailed description, unless otherwise described, the same drawing reference numerals are understood to refer to the same elements, features, and structures.

It will be understood that when an element is referred to as being "connected to," "coupled to," or "accessed to" another element, it can be directly connected, coupled, or accessed to the other element or intervening elements may be present. Also, it will be further understood that when an element is described to "comprise/include" or "have" another element, it specifies the presence of still another element, but do not preclude the presence of another element uncles otherwise described.

Further, the terms, such as first, second, and the like, may be used herein to describe elements in the description herein. The terms are used to distinguish one element from another element. Thus, the terms do not limit the element, an arrangement order, a sequence or the like. Therefore, a first element in an example may be referred to as a second element in another example. Likewise, a second element in an example may be referred to as a first element in another example.

Herein, distinguishing elements are merely provided to clearly explain the respective features and do not represent that the elements are necessarily separate from each other. That is, a plurality of elements may be integrated into a single hardware or software unit. Also, a single element may be distributed to a plurality of hardware or software units. Therefore, unless particularly described, the integrated or distributed example is also included in the scope of the present disclosure.

Herein, elements described in various examples may not be necessarily essential and may be partially selectable. Therefore, an example including a partial set of elements described in an example is also included in the scope of the present disclosure. Also, an example that additionally includes another element to elements described in various examples is also included in the scope of the present disclosure.

Further, the description described herein is related to a wireless communication network, and an operation performed in a wireless communication network may be performed in a process of controlling a network and transmitting data by a system that controls a wireless network, e.g., a base station, or may be performed in a user equipment connected to the wireless communication network.

It is apparent that various operations performed for communication with a terminal in a network including a base station and a plurality of network nodes may be performed by the base station or by other network nodes in addition to the base station. Here, the term 'base station (BS)' may be interchangeably used with other terms, for example, a fixed station, a Node B, eNodeB (eNB), gNodeB (gNB), and an access point (AP). Also, the term 'terminal' may be interchangeably used with other terms, for example, user equipment (UE), a mobile station (MS), a mobile subscriber station (MSS), a subscriber station (SS), and a non-AP station (non-AP STA).

Herein, transmitting or receiving a channel includes a meaning of transmitting or receiving information or a signal through the corresponding channel. For example, transmitting a control channel indicates transmitting control information or a signal through the control channel. Likewise, transmitting a data channel indicates transmitting data information or a signal through the data channel.

In the following description, although the term "new radio (NR) system" is used to distinguish a system according to various examples of the present disclosure from the existing system, the scope of the present disclosure is not limited thereto. Also, the term "NR system" used herein is used as an example of a wireless communication system capable of supporting various subcarrier spacings (SCSs). However, the term "NR system" itself is not limited to the wireless communication system that supports the plurality of SCSs.

FIG. 1 illustrates an example of an NR frame structure and a numerology according to an embodiment of the present disclosure.

In NR, a basic unit of a time domain may be $T_c=1/(\Delta f_{max} \cdot N_f)$. Here, $\Delta f_{max}=480 \cdot 10^3$ and $\Delta f_f=4096$. Also, $\kappa=T_s/T_c=64$ may be a constant about a multiple relationship between an NR time unit and an LTE time unit. In LTE, $T_s=1/(\Delta f_{ref} \cdot \Delta f_{f,\ ref})$, $\Delta f_{ref}=15 \cdot 10^3$ and $N_{f,ref}=2048$ may be defined as a reference time unit.

Frame Structure

Referring to FIG. 1, a time structure of a frame for a downlink/uplink (DL/UL) transmission may include $T_f=$ $(\Delta f_{max} N_f/100) \cdot T_s = 10$ ms. Here, a single frame may include 10 subframes corresponding to $T_{sf} = (\Delta f_{max} N_f/1000) \cdot T_s = 1$ ms. A number of consecutive orthogonal frequency division multiplexing (OFDM) symbols per subframe may be $N_{symb}^{subframe,\mu} = N_{symb}^{slot} N_{slot}^{subframe,\mu}$. Also, each frame may be divided into two half frames symb and the half frames may include 0~4 subframes and 5~9 subframes. Here, half frame 1 may include 0~4 subframes and half frame 2 may include 5~9 subframes.

Here, a transmission timing of uplink transmission frame i is determined based on a downlink reception timing at a UE according to the following Equation 1.

In Equation 1, $N_{TA,offset}$ denotes a TA offset value occurring due to a duplex mode difference and the like. Basically, in a frequency division duplex (FDD), $N_{TA,offset}=0$. In a time division duplex (TDD), $N_{TA,offset}$ may be defined as a fixed value by considering a margin for a DL-UL switching time.

$$T_{TA} = (N_{TA} + N_{TA,offset}) T_c \quad \text{[Equation 1]}$$

Figure 2:
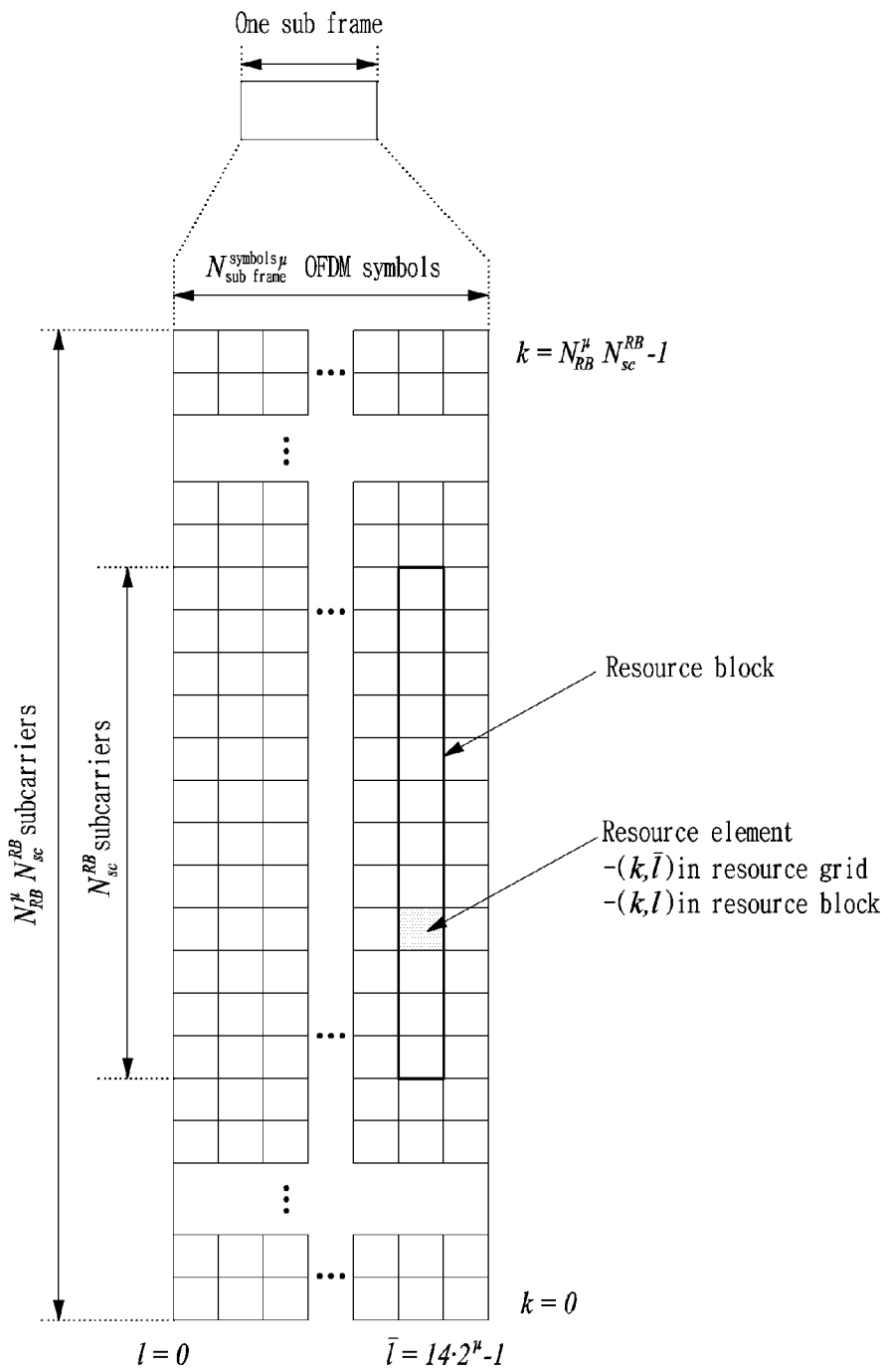
FIG. 2 illustrates an example of a resource grid and a resource block according to an embodiment of the present disclosure.

FIG. 2 illustrates an example of a resource grid and a resource block.

Referring to FIG. 2, a resource element within a resource grid may be indexed based on each subcarrier spacing. Here, a single resource grid may be generated for each antenna port and for each subcarrier spacing. Uplink/downlink transmission and reception may be performed based on a corresponding resource grid.

A single resource block may be configured on a frequency domain using 12 resource elements and may configure an index $n_{PRB}$ for a single resource block every 12 resource elements as represented by the following Equation 2. An index of the resource block may be used in a specific frequency band or system bandwidth.

$$n_{PRB} = \left\lfloor \frac{k}{N_{sc}^{RB}} \right\rfloor \quad \text{[Equation 2]}$$

Numerologies

Numerologies may be variously configured to meet various services and requirements of the NR system. Also, referring to the following Table 1, the numerologies may be defined based on an SCS, a cyclic prefix (CP) length, and a number of OFDM symbols per slot, which are used in an OFDM system. The aforementioned values may be provided to a UE through upper layer parameters, DL-BWP-mu and DL-BWP-cp (DL) and UL-BWP-mu and UL-BWP-cp (UL).

Also, for example, referring to the following Table 1, if $\mu=2$ and SCS=60 kHz, a normal CP and an extended CP may be applied. In other bands, only the normal CP may be applied.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Here, a normal slot may be defined as a basic time unit used to transmit a single piece of data and control information in the NR system. A length of the normal slot may basically include 14 OFDM symbols. Also, dissimilar to a slot, a subframe may have an absolute time length corresponding to 1 ms in the NR system and may be used as a reference time for a length of another time section. Here, for coexistence and backward compatibility of the LTE and the NR system, a time section, such as an LTE subframe, may be required for an NR standard.

For example, in the LTE, data may be transmitted based on a transmission time interval (TTI) that is a unit time. The TTI may include at least one subframe unit. Here, even in the LTE, a single subframe may be set to 1 ms and may include 14 OFDM symbols (or 12 OFDM symbols).

Also, in the NR system, a non-slot may be defined. The non-slot may refer to a slot having a number of symbols less by at least one symbol than that of the normal slot. For example, in the case of providing a low latency such as an Ultra-Reliable and Low Latency Communications (URLLC) service, a latency may decrease through the non-slot having the number of slots less than that of the normal slot. Here, the number of OFDM symbols included in the non-slot may be determined based on a frequency range. For example, a non-slot with 1 OFDM symbol length may be considered in the frequency range of 6 GHz or more. As another example, a number of symbols used to define the non-slot may include at least two OFDM symbols. Here, the range of the number of OFDM symbols included in the non-slot may be configured with a length of a mini slot up to (normal slot length)−1. Here, although the number of OFDM symbols may be limited to 2, 4, or 7 as a non-slot standard, it is provided as an example only.

Also, for example, an SCS corresponding to $\mu=1$ and 2 may be used in the unlicensed band of 6 GHz or less and an SCS corresponding to $\mu=3$ and 4 may be used in the unlicensed band above 6 GHz. Here, for example, if $\mu=4$, it may be used only exclusive for a synchronization signal block (SSB), which is described below. However, it is provided as an example only and the present disclosure is not limited thereto.

Also, Table 2 shows a number $N_{slot}^{symb,\mu}$ of OFDM symbols per slot for each SCS setting. Table 2 shows a number of OFDM symbols per slot according to each SCS value, a number of slots per frame, and a number of slots per subframe, as provided by Table 1. Here, in Table 2, the values are based on the normal slot having 14 OFDM symbols.

TABLE 2

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Also, as described above, if $\mu=2$ and SCS=60 kHz, the extended CP may be applied. In Table 3, in the case of the extended CP, each value may be indicated based on the normal slot of which the number of OFDM symbols per slot $N_{slot}^{symb,\mu}$ is 12. Here, Table 3 shows the number of symbols per slot, the number of slots per frame, and the number of slots per subframe in the case of the extended CP that follows the SCS of 60 kHz.

TABLE 3

| μ | $N_{symb}^{slot}$ | $N_{slot}^{frame,\mu}$ | $N_{slot}^{subframe,\mu}$ |
|---|---|---|---|
| 2 | 12 | 40 | 4 |

Next, a structure of an SS/Physical Broadcast Channel (PBCH) in the NR system and an initial cell access structure in the NR system are described.

Hear, an NR base station (i.e., gNB) may periodically transmit signals and channels as shown in the following Table 4 to allow an initial cell selection of UEs in a cell.

TABLE 4

SS/PBCH block (i.e. SSB)
SIB1 (System Information Block 1)
Other SIBs

For example, the SS/PBCH block may be the aforementioned SSB. Here, even in the NR system, a UE may need to receive a broadcast channel for forwarding a synchronization signal and important system information transmitted from a corresponding wireless access system to perform an initial wireless access. To this end, the UE may check receiving sensitivity of a synchronization signal to discover an optical cell present in a most excellent channel environment. The UE may perform a frequency/time synchronization and cell identification operation for performing an initial access to an optimal channel among one or more channels in a specific frequency band operated based on the checked receiving sensitivity. The UE may verify a boundary of OFDM symbol timing through the aforementioned operation and then may initiate a PBCH demodulation in the same SSB.

Hear, the UE may receive a PBCH demodulation reference signal (DMRS) and may perform a PBCH demodulation. Also, the UE may acquire 3-least significant bit (LSB) information from SSB index information bits through the PBCH DMRS. The UE may acquire information included in a PBCH payload by performing the PBCH demodulation. The UE may perform a procedure of demodulating SIB 1 based on the information acquired through the PBCH.

For example, in the NR system, the UE may receive remaining system information (RMSI) through a broadcast signal or channel as system information not transmitted from the PBCH. Also, the UE may receive other system information (OSI) and a paging channel through a broadcast signal or channel as other additional system information.

Hereinafter, the UE may access a base station through a random access channel (RACH) process and then perform a mobility management.

Also, for example, when the UE receives an SSB, the UE needs to set an SSB composition and an SS burst set composition.

NR V2X Service

In association with a V2X service, the existing V2X service may support a set of basic requirements for V2X services. Here, the requirements are designed basically in sufficient consideration of a road safety service. Therefore, V2X UEs may exchange autonomous status information through a sidelink and may exchange the information with infrastructure nodes and/or pedestrians.

Meanwhile, in a further evolved service (e.g., LTE Rel-15) as the V2X service, new features are introduced by considering a carrier aggregation in a sidelink, a high order modulation, a latency reduction, a transmit (Tx) diversity, and feasibility for sTTI. Coexistence with V2X UEs (the same resource pool) is required based on the aforementioned description, and the services are provided based on LTE.

For example, technical features may be classified largely based on four categories as represented by the following Table 5 by considering use cases for supporting a new V2X service as system aspect (SA) 1. Here, in Table 5, "Vehicles Platooning" may be technology that enables a plurality of vehicles to dynamically form a group and similarly operate. Also, "Extended Sensors" may be technology that enables exchange of data gathered from sensors or video images. Also, "Advanced Driving" may be technology that enables a vehicle to drive based on semi-automation or full-automation. Also, "Remote Driving" may be technology for remotely controlling a vehicle and technology for providing an application. Based thereon, further description related thereto may be given by the following Table 5.

TABLE 5

Vehicles Platooning
Vehicle Platooning enables the vehicles to dynamically form a platoon travelling together. All the vehicles in the platoon obtain information from the leading vehicle to manage this platoon. These information allow the vehicles to drive closer than normal in a coordinated manner, going to the same direction and traveling together.
Extended Sensor
Extended Sensor enables the exchange of raw or processed data gathered through local sensor or live video images among vehicles, road site units, devices of pedestrian and V2X application servers. The vehicles can increase the perception of their environment beyond of what their own sensors can detect and have a more broad and holistic view of the local situation. High data rate is one of the key characteristics.
Advanced Driving
Advanced Driving enables semi-automated or full-automated driving. Each vehicle and/or RSU shares its own perception data obtained from its local sensors with vehicles in proximity and that allows vehicles to synchronize and coordinate their trajectories or maneuvers. Each vehicle shares its driving intention with vehicles in proximity too.
Remote Driving
Remote Driving enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements.

Also, the above SA1 may use all of LTE and NR as enhanced V2X (eV2X) support technology for supporting the new V2X service. For example, an NR V2X system may be a first V2X system. Also, an LTE V2X system may be a second V2X system. That is, the NR V2X system and the LTE V2X system may be different V2X systems. In the following, description is made based on a method of satisfying low latency and high reliability required in an NR sidelink based on the NR V2X system. Here, even in the LTE V2X system, the same or similar composition may be expanded and thereby apply. However, it is provided as an example only and the present disclosure is not limited thereto. That is, even in the LTE V2X system, the present disclosure may apply to an interactable portion and is not limited to the following embodiment. Here, for example, NR V2X capability may not be limited to essentially support only V2X services and V2X RaT to be used may be selected.

NR Sidelink

An NR sidelink may be used for the aforementioned NR V2X service. Here, for example, an NR sidelink frequency may use FR1 that is a frequency of 6 GHz or less and FR2 (i.e., up to 52.6 GHz) that is a frequency over 6 GHz. Also, for example, the NR sidelink frequency may use all of unlicensed ITS bands and licensed ITS bands. That is, as described above, a common design method for supporting the respective frequency bands may be required. To this end, an NR sidelink design that is for an NR system may be required. For example, similar to an NR standard design, although it is not beam-based, even an omni-directional Tx/Rx may basically require the NR sidelink design capable of supporting beam-based transmission and reception. However, it is provided as an example only.

Also, for example, a physical channel for NR V2X sidelink may be set. For example, an NR Physical Sidelink Shared Channel (PSSCH) may be a data channel for NR sidelink as a physical channel. Also, for example, an NR Physical Sidelink Control Channel (PSCCH) may be a control channel for NR sidelink as a physical channel. Here, scheduling information for the data channel of the NR sidelink and control information may be forwarded through the NR PSCCH. For example, Sidelink Control Information (SCI) may be transmitted based on a format that defines fields about control information associated with scheduling of the NR sidelink data channel and control information transmitted through the NR PSCCH may be transmitted based on an SCI format.

Also, for example, an NR Physical Sidelink Feedback Channel (PSFCH) may be defined. Here, the NR PSFCH may be an NR Hybrid Automatic Repeat Request (HARQ) feedback channel as a physical channel. Here, HARQ-ACK feedback information, Channel Status Information (CSI), and other information corresponding to the NR sidelink data channel may be forwarded through the NR PSFCH. In detail, Sidelink Feedback Control Information (SFCI) including feedback information may be forwarded through the NR PSFCH. Here, SFCI may include information about at least one of HARQ-ACK, channel quality information (CQI), a precoding matrix indicator (PMI), a rank indicator (RI), reference signal received power (RSRP), reference signal received quality (RSRQ), path-gain/pathloss, a scheduling request indicator (RSI), contention resolution identity (CRI), an interference condition, a vehicle motion, and the like. However, it is provided as an example only and the present disclosure is not limited thereto. Here, for example, the NR PSFCH is further described.

NR V2X QoS Requirements

NR V2X QoS requirements may be a higher level than existing V2X (e.g., LTE V2X) requirements into consideration of a service of the above Table 5. For example, delay may be set within 3 ms to 100 ms based on the following Table 6. Also, reliability may be set between 90% and 99.999%. Also, a data rate may be required up to 1 Gbps.

TABLE 6

Delay: [3,100 ms]
Reliability: [90%, 99.999%]
Data rate: up to 1 Gbps

That is, as described above, QoS requirements capable of meeting low latency and high reliability may be required into consideration of a V2X service. Here, for example, access stratum (AS) level QoS management may be required to meet the QoS requirements. Also, for example, HARQ and CSI may be required into consideration of link adaptation to meet the QoS requirements. Also, for example, maximum bandwidth (max. BW) capability may differ for each NR V2X UE. That is, AS level information needs to be exchanged between UEs based on the aforementioned description. For example, the AS level information may include at least one of UE capability, QoS related information, radio bearer configuration, and physical layer configuration. Also, for example, the AS level information may further include other information. However, it is provided as an example only and the present disclosure is not limited thereto.

The following Table 7 may show the respective terms applied herein. However, it is provided as an example only and the present disclosure is not limited thereto.

TABLE 7

UMTS (Universal Mobile Telecommunications System):
refers to 3rd Generation (3G) mobile communication technology based on Global
System for Mobile Communication (GSM), developed by 3GPP
EPS (Evolved Packet System):
refers to a network system that includes an Evolved Packet Core (EPC) that is a packed
switched (PS) core network based on an Internet protocol (IP) and an access network
such as LTE/Universal Terrestrial Radio Access Network (UTRAN). A network
evolved from Universal Mobile Telephone System (UMTS).
NodeB:
refers to a base station of GERAN/UTRAN and is installed outdoors and has coverage
of macro cell scale.
eNodeB:
refers to a base station of E-UTRAN and is installed outdoors and has coverage of
macro cell scale.
gNodeB:
refers to a base station of NR and is installed outdoors and has coverage of macro cell
scale.
UE (User Equipment):
refers to a user equipment. The UE may also be interchangeably used with terms,
terminal, mobile equipment (ME), mobile station (MS), and the like. Also, the UE may
be a portable device, such as a laptop computer, a mobile phone, a personal digital
assistant (PDA), a smartphone, a multimedia device, etc. The term "UE" or "terminal"
in Machine Type Communications (MTC) related content may refer to an MTC device.

TABLE 7-continued

RAN (Radio Access Network):
refers to a unit that includes NodeB, eNodeB, and gNodeB, and a radio network
controller (RNC) for controlling the same in a 3GPP network, and is present between
UEs and provides a connectivity to a core network.
NG-RAN (Next Generation Radio Access Network):
refers to ng-eNB (E-UTRA UP/CP protocol) and gNB (NR UP/CP protocol) base
station nodes connected to 5GC (5G Core NW) based on an NG interface in a 3GPP
network.
Xn interface:
refers to an interface for interconnection between NG-eNG and gNB.
PLMN (Public Land Mobile Network):
refers to a network configured to provide a mobile communication service to
individuals, and may be configured for each operator.
Proximity service (or ProSe Service or Proximity based Service):
refers to a service that enables discovery and direct communication between physically
proximate apparatuses, communication through a base station, or communication
through a third apparatus. Here, user plane data is exchanged through a direct data path
without going through a 3GPP core network (e.g., EPC).
LTE SFN (System Frame Number):
refers to a frame index for time domain reference of LTE.
NR SFN (System Frame Number):
refers to a frame index for time domain reference of NR.
NR DFN (Direct Frame Number):
refers to a frame index for time domain reference of an NR sidelink.

V2X Sidelink Design the NR V2X sidelink design to meet the requirements for the newly evolved V2X (i.e., eV2X) services is described.

In particular, a synchronization procedure and method required to form a radio link for an NR sidelink are provided in detail. Here, it is assumed that an NR sidelink frequency for NR sidelink operation is designed by considering all of FR1 and FR2 (i.e., up to 52.6 GHz) unlicensed ITS bands and licensed ITS bands, and frequency bands and range operated by the NR system, and it is assumed that the NR sidelink frequency needs to be applicable as a common design in all of FR1 and FR2. Also, the availability of LTE (ng-eNB)/NR Uu link that is the aforementioned 3GPP NG-RAN needs to be considered for NR V2X sidelink transmission and reception procedures.

A design for eV2X synchronization information transmission and signal transmission and reception to meet higher requirements from the newly evolved V2X services needs to be considered. Here, the frequency for NR V2X SL communication based on technologies required in the new system, in different with conventional system (e.g. LTE), may further consider at least one of elements in the following Table 8. By applying NR V2X SL based on NR wireless connection technology, especially a technology related with uplink transmission in the following Table 8, a satisfaction of requirements for the new V2X is needed.

Also, in addition to the following Table 8, by considering the new system, other elements may be considered and it is provided as an example only and the present disclosure is not limited thereto.

TABLE 8 a scalable frequency use and configuration according to broadband frequency band
and maximum bandwidth of UE (e.g., bandwidth part [BWP]),
various numerologies (e.g., variable SCSs, a number of OFDM symbols per a slot (or
subframe),
a slot format (slot/non-slot)
a beam-based transmission and reception for coping with a signal attenuation in a
frequency band of 60 GHz or more corresponding to a high frequency band,
a configured grant-based uplink transmission and reception for providing a lower
latency Also, NR V2X sidelink physical channel and signal, and basic slot structure and physical resources may show the respective terms in the following Table 9.

TABLE 9

NR PSSCH (Physical Sidelink Shared Channel)
Physical layer NR SL data channel
NR PSCCH (Physical Sidelink Control Channel)
Physical layer NR SL control channel, that is, a channel for forwarding control
information as well as scheduling information of an NR SL data channel. A
transmitting UE transmits the NR PSCCH to a receiving UE at a time of or before
transmitting the NR PSSCH.
NR PSHICH (Physical Sidelink HARQ-feedback Indicator Channel):
Physical layer NR HARQ-feedback channel, that is, a channel for forwarding Channel
State Information (CSI) as well as HARQ-ACK feedback information corresponding to
the NR SL data channel.

TABLE 9-continued

NR SLSS/PSBCH block:
Synchronization and broadcast channel block in which an NR SL synchronization
signal and broadcast channel are transmitted on a single continuous time in a physical
layer. To support a beam-based transmission on an NR frequency band, transmission
may be periodically performed based on a set of one or more block indices. A
synchronization signal may include a primary sidelink synchronization signal (PSSS)
and a secondary sidelink synchronization signal (SSSS) and a sequence for a
corresponding signal may be generated based on at least one SLSSID value. A Physical
Sidelink Broadcast Channel (PSBCH) is transmitted with an SLSS to forward system
information required to perform V2X SL communication. Likewise, the PSBCH is
periodically transmitted in a form of a set of SLSS/PSBCH block indices to support
beam-based transmission.

Figure 3:
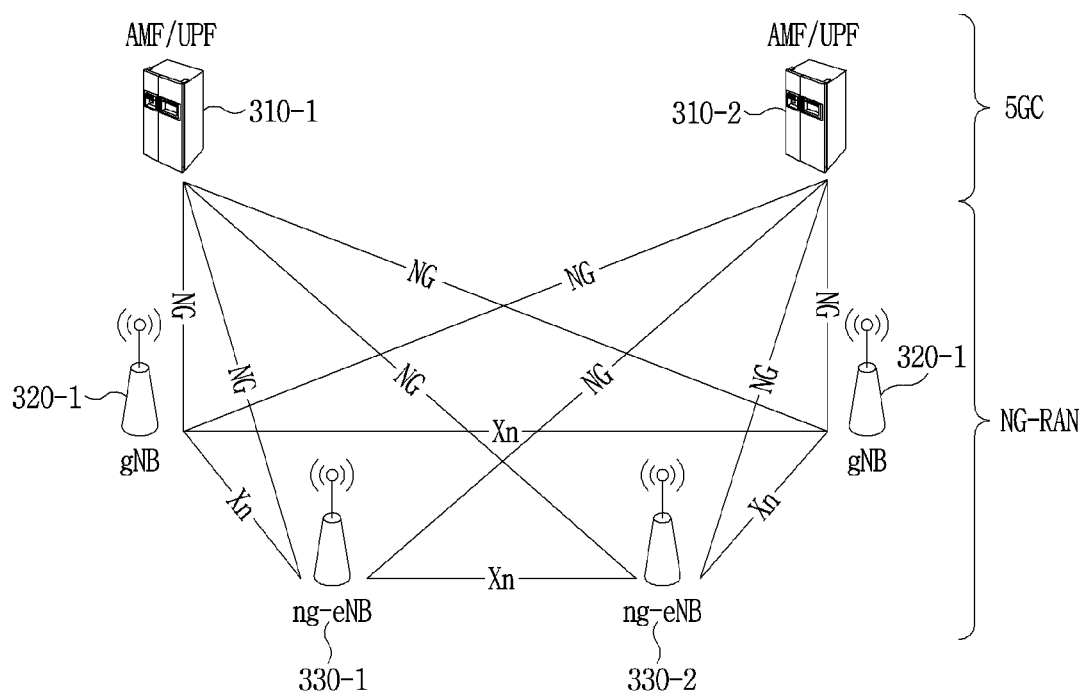
FIG. 3 illustrates an example of a system architecture according to an embodiment of the present disclosure.

Also, FIG. 3 illustrates an example of a basic network architecture configuration and deployment scenarios considered for an NR V2X sidelink.

For example, referring to FIG. 3, NG interfaces may be set between nodes 310-1 and 310-2 of a 5-th generation core (5GC NW) and nodes 320-1, 320-2, 330-1, and 330-2 of an NG-RAN. Also, Xn interfaces may be set between the nodes 320-1, 320-2, 330-1, and 330-2 of the NG-RAN. Here, in the above architecture, corresponding nodes may be interconnected through the corresponding Xn interface based on gNB (NR UP/CP protocol) corresponding to the nodes 320-1 and 320-2 and ng-eNB (E-UTRA UP/CP protocol) corresponding to the nodes 330-1 and 330-2, which constitute the NG-RAN. Also, as described above, in the 5GC, corresponding nodes may be interconnected through a corresponding NG interface. Here, for example, in the above architecture, all of an LTE sidelink UE and an NR sidelink UE may be controlled by the NG-RAN (i.e., LTE Uu and NR Uu) based on the gNBs and ng-eNBs. Therefore, when transmitting synchronization information, the NR sidelink UE may receive synchronization information from the LTE Uu or NR Uu link, and may transmit NR sidelink synchronization information (e.g., SL synchronization signal/SL Physical Broadcast Channel (PBCH)) based on the received synchronization information. However, it is provided as an example only and the present disclosure is not limited thereto. The NR sidelink UE may also acquire the synchronization information through the LTE Uu link as well as the NR Uu link.

Meanwhile, with respect to V2X sidelink communication, V2X sidelink UEs may perform the V2X sidelink communication. Here, predetermined conditions need to be met such that the V2X sidelink UEs may start the communication. The conditions may be represented by the following Table 10. That is, a V2X sidelink UE may perform V2X sidelink communication in an RRC idle mode, inactive mode, or connected mode. Also, V2X sidelink UEs that perform the V2X sidelink communication need to be registered on a selected cell on a using frequency or need to belong to the same Public Land Mobile Network (PLMN). Also, if a V2X sidelink UE is an OOC on a frequency for V2X sidelink communication, the V2X sidelink UE may perform the V2X sidelink communication only when it is possible to perform the V2X sidelink communication based on pre-configuration.

TABLE 10

If a UE is in an RRC_IDLE or INACTIVE or CONNECTED
mode in a specific cell,
If a UE is registered to a selected cell on a frequency used for V2X
SL communication or belongs to the same PLMN,
If a UE is an OCC on a frequency for a V2X SL TABLE 10-continued communication operation, and if a UE is capable of
performing V2X SL communication based on pre-configuration Here, as described above, to start the V2X sidelink communication, sidelink synchronization information may be required. Therefore, the UE may transmit the sidelink synchronization information. Here, a transmitting UE (sidelink Tx UE) may receive a configuration for transmitting sidelink synchronization information prior to transmitting corresponding synchronization information. Here, for example, the transmitting UE may receive the configuration for transmitting the sidelink synchronization information based on a system information message or an RRC reconfiguration message (in the case of an RRC CONNECTED UE) broadcasted from the above NG-RAN nodes. Also, for example, if an NR V2X sidelink UE (hereinafter, referred to as a UE) is absent in an NG-RAN, the UE may transmit sidelink synchronization information based on the pre-configured information, which is described above.

Figure 4:
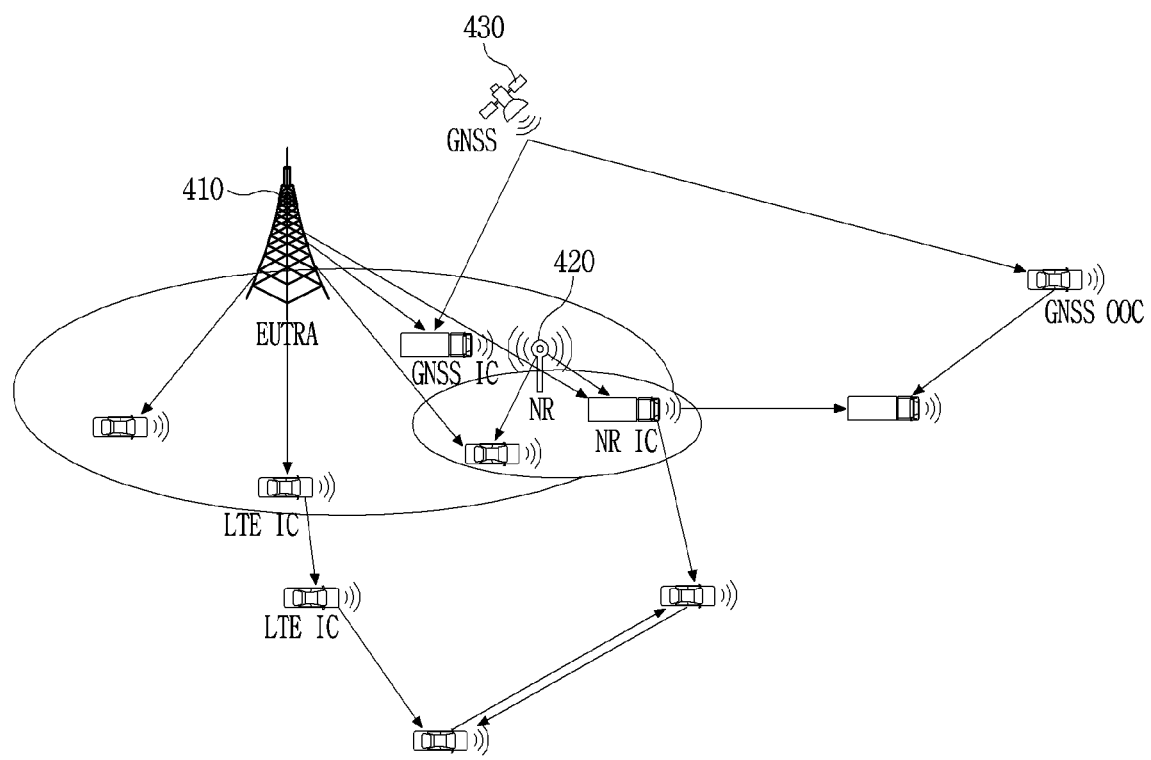
FIG. 4 illustrates an example of a scenario in which a new radio (NR) vehicle-to-everything (V2X) sidelink communication is performed in a 3rd Generation Partnership Project (3GPP) network according to an embodiment of the present disclosure.

FIG. 4 illustrates an example of a scenario in which NR V2X sidelink communication is performed in a 3GPP network based on the aforementioned description. Here, the NR V2X sidelink communication may be performed on the 3GPP network (hereinafter, NG-RAN). Additionally, presence of a Global Navigation Satellite System (GNSS) signal may be considered.

In detail, referring to FIG. 4, each of NR V2X sidelink UEs may be an IC or an OOC based on ng-eNB 610, may also be an IC or an OOC based on gNB 620, and may also be an IC or an OOC based on GNSS 630. Here, NR V2X sidelink UEs may select a resource of synchronization reference based on a location and capability of a UE. Also, for example, in addition to the scenario of FIG. 6, scenarios shown in the following Table 11 may be considered. It is provided as an example only and the present disclosure is not limited thereto.

TABLE 11

NR Uu CONNECTED/IDLE/Inactive for NR Sidelink
NG-eNB Uu CONNECTED/IDLE for NR Sidelink
EN-DC or MR-DC for NR Sidelink Meanwhile, in the following, an NR SCS may refer to one of an SCS value for NR DL SS/PBCH, an SCS value for an NR BWP (data/control channel), and a reference SCS value defined/set for comparison of NR V2X SCS values. As another example, the NR SCS may refer to one of an SCS value for NR V2X SLSS/PSBCH, an SCS value for NR V2X BWP or a resource pool (data/control channel), and a reference SCS value defined/set for comparison of NR V2X SCS values. However, it is provided as an example only and the present disclosure is not limited thereto. Also, for example, 30 kHz SCS value may be set as a default value and used for 5.9 GHz ITS spectrum. However, it is provided as an example only and the present disclosure is not limited thereto.

In the case of performing NR V2X sidelink communication, data transmission may be performed based on unicast/groupcast. Here, for example, unicast transmission may refer to transmitting a message from a single UE to another UE, that is, one-to-one transmission. Also, broadcast transmission may refer to a scheme of transmitting a message to all of UEs regardless of whether a service is supported at an Rx UE. That is, a single UE may transmit a message regardless of whether a plurality of Rx UEs is supporting a service. Meanwhile, a groupcast transmission scheme may be a scheme of transmitting a message to a plurality of UEs that belongs to a group.

Here, for example, whether to activate the unicast, groupcast, or broadcast data transmission and reception and whether to perform a session connection may be determined at an upper layer. That is, although a physical layer of a V2X UE may operate based on an instruction that is determined in an upper layer, it is provided as an example only and the present disclosure is not limited.

Also, for example, a V2X UE may perform corresponding transmission and reception after a session for corresponding unicast or groupcast data transmission is formed. When a V2X UE performs transmission and reception based on the aforementioned session, physical layer parameter information for data transmission corresponding to unicast or groupcast may be known in advance in the physical layer of the V2X UE. For example, the V2X UE may receive and recognize in advance the aforementioned information from a base station. As another example, the aforementioned information may be information preset to the V2X UE. Here, for example, unicast or multicast data transmission and reception may apply only to a case in which a relatively small number of V2X UEs are present around a Tx V2X UE and a session is stably maintained. In addition, if a session is unstable or if adjacent V2X UEs vary a lot, data transmission may be performed based on broadcast transmission. Here, it is provided as an example only and the present disclosure is not limited thereto.

Also, for example, as described above, unicast or groupcast transmission and reception may be determined in an application layer end as an upper layer. Here, for example, data allocable to transmission and reception generated in an application layer may not be directly mapped to a radio layer. Here, for example, in the case of performing the unicast or groupcast transmission and reception, a mapping relationship or a connection establishment procedure may be required to perform data transmission and reception on the radio layer. However, it is provided as an example only and the present disclosure is not limited thereto.

Also, for example, in the case of performing the unicast data transmission and reception, corresponding Tx and Rx UEs may need to establish a session by performing a procedure (e.g., a discovery procedure) of discovering their presence, and such session establishment may be performed based on various methods. Here, the session establishment between the UEs may be performed with assistance of a base station. The base station may gather position information of UEs and may determine whether UEs capable of performing unicast or groupcast data transmission and reception are adjacent to each other. Here, for example, the base station may determine whether the UEs are adjacent to each other based on a threshold. Here, a predetermined value may be used to determine the threshold. When the UEs in a cell are determined to be adjacent to each other, the base station may initialize a corresponding discovery procedure and the UEs may perform the corresponding discovery procedure to discover each other based on an initialization procedure. Also, the base station may determine whether an adjacent V2X SL UE is present by designing a new discovery channel and by periodically transmitting and receiving the corresponding channel. Also, the base station may determine whether an adjacent UE is present by transmitting a corresponding discovery message on a V2X data channel. However, it is provided as an example only and the present disclosure is not limited thereto. That is, session establishment for unicast or groupcast data transmission and reception may be completed based on the aforementioned procedures. Subsequently, the upper layer may notify the physical layer of information about the session establishment and may perform a physical layer operation, such as HARQ-ACK, CSI, and link adaptation.

PSFCH for Sidelink Communication

As described above, a PSFCH for feedback information transmission may be set. For example, in the case of performing NR V2X sidelink communication, a UE may perform transmission based on unicast and/or groupcast. Here, a physical layer ID for unicast and/or groupcast transmission and reception may be generated. Also, the UE may provide feedback information through the PSFCH based on the aforementioned physical layer ID. For example, as described above, a high reliability and low latency operation may be required to meet requirements for a service provided through NR V2X sidelink communication. Accordingly, there is a need to construct and provide feedback information even in sidelink communication. In the following a PSFCH constructing method is described based on the above description. For example, a PSFCH structure may consider all of a sequence-based channel structure and a payload (modulation symbol) form channel structure, which is described below. Also, the PSFCH may include Sidelink Feedback Control Information (SFCI). Here, the SFCI may include information about the following Table 12 by considering sidelink unicast and/or groupcast transmission and reception. That is, the SFCI may include HARQ-ACK information, channel state information (CSI), and signal related information.

TABLE 12

HARQ-ACK (including NACK only transmission)
PMI/CQI/RI/PTI corresponding to CSI (Channel State Information)
RSRP, RSRQ, path-gain/pathloss, SRI (SRS resource indicator),
CRI (CSI-RS resource indicator), interference condition, vehicle motion Here, HARQ-ACK information may be included in feedback information (e.g., SFCI) for unicast and/or groupcast transmission performed on a sidelink. For example, if only HARQ-ACK is included in feedback information, the PSFCH may be configured using a small number of bits. Here, 1 bit or 2 bits may be used to configure the PSFCH. However, it is provided as an example only. Also, a large number of bits may be used to configure the PSFCH. For example, referring to Table 12, the SFCI may include CSI feedback information for link adaptation and multiple input multiple output (MIMO) transmission. Also, for example, HARQ-ACK bits corresponding to a plurality of TBs may be present on at least one slot. Here, the SFCI may include HARQ-ACK bit information corresponding to the plurality of TBs and a number of bits may increase based thereon.

That is, an SFCI size may be variously set based on at least one of a scenario, a transmission scheme, and related configuration on NR V2X sidelink communication. Here, as described above, at least one PSFCH transmission format may be required to effectively address varying SFCI sizes.

Here, based on the aforementioned description, a format of the PSFCH may be set as a format for forwarding SFCI smaller than 2 bits or a format for forwarding SFCI greater than 2 bits. For example, if a size of SFCI is less than or equal to 2 bits, the PSFCH format may use a sequence-based format or a modulation symbol-based format. It is further descried below.

Sidelink Connection Management Procedure and Signaling

For example, the sidelink connection management procedure may include at least one of a connection establishment, a connection release, a connection maintenance, and a security activation. As described above, NR V2X may support unicast and/or groupcast transmission. Therefore, a connection management procedure may be required between UEs involved with unicast and/or groupcast transmission. For example, the sidelink connection management procedure may be performed through a PC5-Signaling protocol in an application layer. Also, additionally, release, maintenance, and management may be performed for an AS layer connection by considering an AS layer connection management procedure. In detail, AS parameter configuration may be performed by applying a related channel measurement result such that specific AS layer operations (e.g., HARQ, CSI, etc.) of AS layer connection may be performed on an AS layer for the AS layer connection. Here, PC5-RRC may be required. Here, the PC5-RRC may refer to signaling and configuration between RRC layers generated between UEs that perform sidelink V2X communication. That is, the PC5-RRC refers to an existing RRC and may be distinguished from an RRC layer used for a Uu link (a link between base station and UE). Here, for example, the sidelink connection management procedure may be performed in an upper layer level. That is, procedures about connection establishment between UEs may be performed in an upper layer level. Here, for example, the NR V2X may additionally perform the sidelink connection management procedure in an AS layer level. Here, the PC5-RRC may be set when the sidelink connection management procedure is additionally performed in the AS layer level.

For example, in LTE, connection between D2D UEs for unicast transmission may be generated by the PC5 signaling protocol after the discovery procedure. Also, a session or connection for groupcast transmission is not generated. Radio bearer may not be generated in one-to-one communication establishment set for unicast transmission. Also, a one-to-one layer 2 link between UEs performing one-to-one communication may be distinguished by a combination of layer-2 IDs of UEs. Here, the UEs may be included in a plurality of layer 2 links for one-to-one communication using the same layer 2 ID. In D2D connection for the existing one-to-one communication, AS layer information exchange is not performed. The PC5 signaling protocol may be used to set the one-to-one layer 2 link between the UEs. Here, for example, PC5-S refers to a PC5 signaling protocol stack and may be performed based on a control plane signal through a PC5 interface for configuration, maintenance and release of a direct link between two UEs. Here, in the legacy LTE (e.g., LTE D2D), a PC5-S signal may be designated for a connection management and may be used for a connection management such as a direct connection configuration, maintenance, and release procedure, or a secure mode such as secure mode procedure. Therefore, in the case of PC5-S, AS layer parameter configuration excluding a secure related parameter may be impossible. Here, for example, in the NR V2X, a plurality of unicast and/or groupcast connections (or sessions) may be present and high QoS may be required compared to the existing system. An ID value for each connection may be required by considering the aforementioned situation, which is described below.

SL Layer-1 ID for Unicast and/or Groupcast Transmission

For example, as described above, an SL layer-1 ID value for guaranteeing efficiency and reliability of unicast and/or groupcast based NR V2X communication may be defined in a physical layer. That is, a physical layer ID for sidelink communication may be defined. Here, for clarity of description, although an SL layer-1 ID is used, it is provided as an example only. That is, the SL layer-1 ID may indicate a physical layer ID for sidelink communication and may also be designated using another name. Here, for example, as described above, high QoS requirements may be required in the NR V2X. Therefore, a UE may need to perform a HARQ-ACK feedback, link adaptation, or CSI feedback operation in the physical layer. Also, the UE may perform another operation by considering the high QoS requirements required in the NR V2X. The present disclosure is not limited thereto. Here, for example, the SL layer-1 ID may need to be set for the aforementioned UE operations. In the existing V2X (e.g., LTE V2X), only broadcast transmission is supported, which is described above. Therefore, the layer-1 ID value is determined and used based on 16-bit cyclic redundancy check (CRC) information that is attached to SCI in a PSCCH. Also, in LTE D2D, a layer-1 ID value may be generally used in the physical channel based on a destination ID (for layer-1) provided from a Tx UE to an Rx UE in SCI.

On the other hand, as described above, unlike the existing scenarios, NR V2X may need to support data transmission having further various and high QoS requirements in the physical layer. Also, by considering this aspect, sidelink unicast and/or groupcast transmission may be performed. That is, each UE may additionally perform unicast and/or groupcast transmission as well as the existing broadcast-based sidelink transmission. For example, traffic that requires high reliability and latency may generally use unicast transmission. Here, since unicast communication is one-to-one communication, more unicast connections (UE pair for unicast) may be present compared to the existing sidelink system. That is, in the limited communication range, various types of sidelink communication may be performed based on the high QoS requirements and accordingly, there may be a need to support transmission that guarantees reliability in the physical layer. Hereinafter, a method of setting the above SL layer-1 ID value to effectively support NR V2X communication by considering the aforementioned aspect is described. Here, all of physical layer channels and signals corresponding to unicast and/or groupcast transmission as well as the PSFCH may perform transmission and reception using the SL layer-1 ID value used in the physical layer. That is, the unicast transmission may be performed using a unicast layer-1 ID value. Also, the groupcast transmission may be performed using a groupcast layer-1 ID value. However, it is provided as an example only and the present disclosure is not limited thereto.

Figure 5:
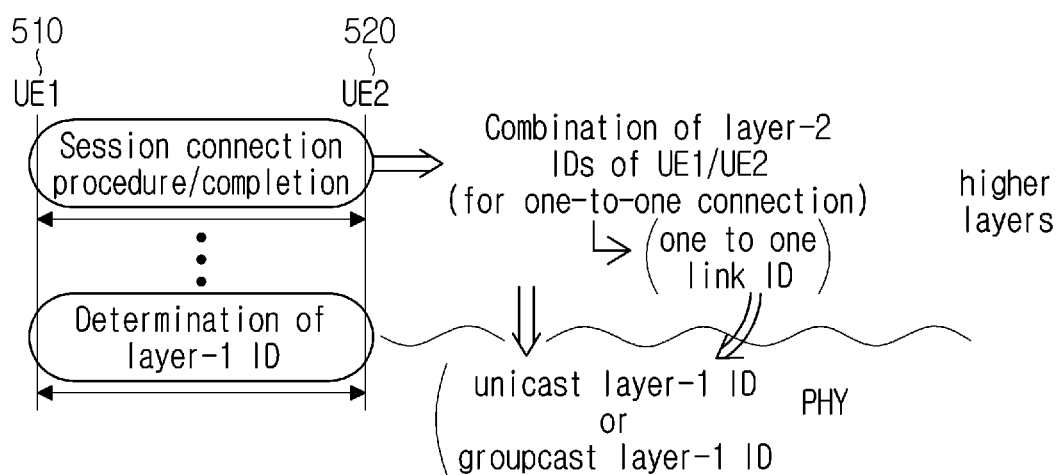
FIG. 5 illustrates an example of a method of determining a physical layer session ID according to an embodiment of the present disclosure.

FIG. 5 illustrates an example of a method of determining an SL layer-1 ID value when a single session is established through a sidelink between UEs. For example, referring to FIG. 5, a first UE (UE 1) 510 and a second UE (UE 2) 520 may perform a session connection through a unicast session connection procedure. When the unicast session is connected, the first UE 510 and the second UE 520 may perform unicast V2X communication through at least one resource pool. Here, for example, a single unicast ID value representing one-to-one connection between UEs may be mapped in each resource pool. Also, for example, at least one unicast ID value may be mapped between two UEs in a single resource pool. That is, a resource pool available for a single unicast transmission may be set based on the aforementioned mapping relationship. Here, for example, the above unicast ID may be a layer-2 ID. Here, the layer-2 ID refers to an ID value used for layer 2 and may be used to identify at least one unicast layer 2 link between two UEs. For example, referring to FIG. 5, the layer-2 ID may be generated through a combination of layer-2 IDs (e.g., layer-2 destination IDs, layer-2 source IDs) of the first UE 510 and the second UE 520. That is, when a session is established between the first UE 510 and the second UE 520, an ID representing the session between the first UE 510 and the second UE 520 may be generated in an upper layer.

Also, for example, a single groupcast ID (group ID) value representing one-to-many connection of UEs may be mapped in each resource pool. Also, for example, at least one groupcast ID value may be mapped between UEs in a single resource pool. That is, a resource pool available for a single groupcast transmission may be set based on the aforementioned mapping relationship. Here, for example, the above groupcast ID may be a layer-2 ID. Here, the layer-2 ID refers to an ID value used for layer 2 and may be used to identify at least one groupcast layer 2 link between UEs representing a connection between UEs in a group.

For example, referring to FIG. 5, the layer-2 ID may be generated through a combination of layer-2 IDs (e.g., layer-2 destination/source IDs) of the first UE 510 and the second UE 520. That is, when a session is established between the first UE 510 and the second UE 520, an ID representing the session between the first UE 510 and the second UE 520 may be generated in the upper layer.

Here, for example, an ID for identifying each unicast and/or groupcast physical link may be required on the physical layer. In detail, an ID for identifying each unicast and/or groupcast physical link may be required to perform operations (e.g., HARQ, CSI, and channel measurement) associated with link adaptation for unicast and/or groupcast transmission performed on the physical layer.

Figure 6:
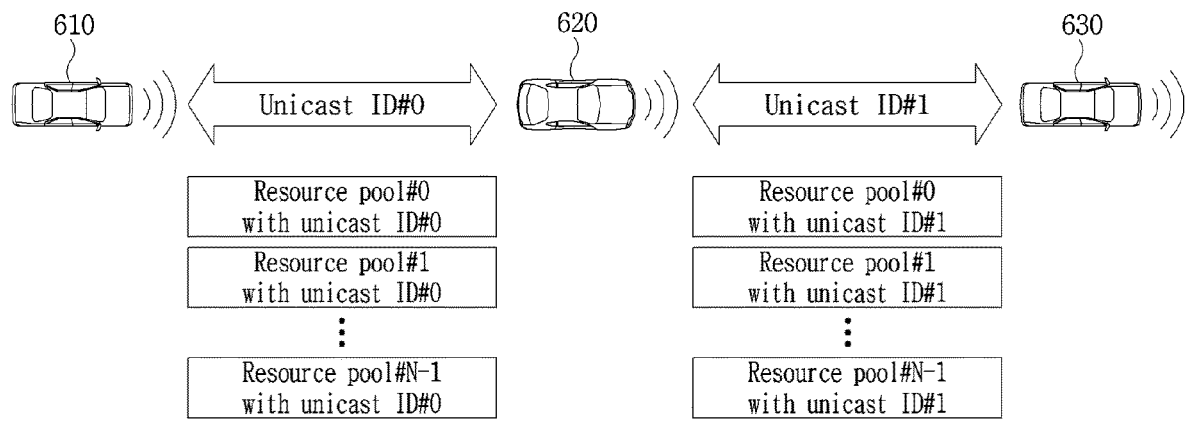
FIG. 6 illustrates an example of an environment in which a plurality of unicasts and/or groupcasts are present according to an embodiment of the present disclosure.

Referring to FIG. 6, a first UE 610 may connect a unicast session with a second UE 620. Also, the second UE 620 may connect a unicast session with a third UE 630. That is, a single UE may establish a unicast session with a plurality of UEs. Here, the second UE 620 needs to distinguish the unicast connection established with the first UE 610 from the unicast connection established with the third UE 630. Here, the second UE 620 may perform sidelink transmission with respect to a corresponding UE by identifying each unicast link. That is, the UE may identify each of a plurality of unicast connections in a physical layer and then perform the unicast transmission. That is, a plurality of unicast and/or groupcast transmissions may be present between UEs performing sidelink communication. Therefore, as described above, an ID for identifying each connection may be required. Here, the ID for identifying each connection may use an ID in the upper layer and may also use an ID in the physical layer based on an operation that considers the link adaptation. Here, for example, in the case of using the ID in the physical layer as the ID (e.g., destination ID) in the upper layer, QoS requirements may not be met or a collision may occur. Therefore, a separate ID for the physical layer may be required. However, it is provided as an example only and the present disclosure is not limited thereto. In the following, a method of determining a physical layer ID (SL layer-1 ID, $n_{ID}^{SL}$) based on the aforementioned description is described.

For example, the SL layer-1 ID may be used as a hopping ID value available in the physical layer for PSFCH transmission. Also, for example, the SL layer-1 ID may be used for another physical layer channel (e.g., PSSCH/PSCCH/PSBCH) and RS (e.g., SL CSI-RS, SL DMRS, SL PT-RS) transmission. Although the following description is made based on the PSFCH transmission for clarity of description, it is provided as an example only. That is, the SL layer-1 ID in the physical layer may be set, without being limited to the above embodiment.

Figure 7:
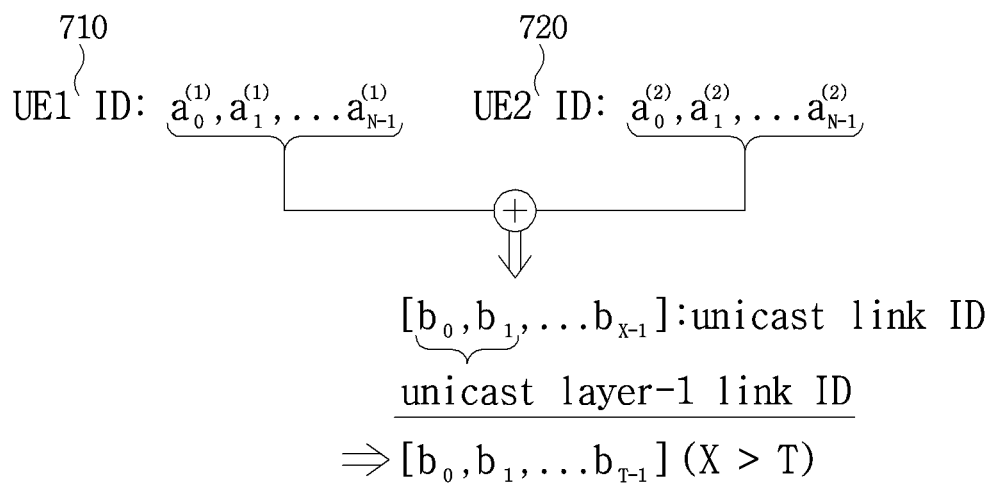
FIG. 7 illustrates an example of a method of determining a physical layer session ID for unicast according to an embodiment of the present disclosure.

Here, for example, the SL layer-1 ID may be a layer-1 link ID induced based on a layer-2 link ID value for identifying an upper layer session. For example, FIG. 7 illustrates a method of inducing a layer-1 link ID based on unicast transmission. Here, as described above, two UEs that connect a unicast session may share an ID mutually. Here, the layer-2 link ID may be generated through a combinations of UE ID values shared between the two UEs through a unicast session connection procedure in the upper layer. In detail, referring to FIG. 7, a first UE 710 and a second UE 720 may connect a unicast session. Here, a layer-2 link ID value ($b_0, b_1, b_2, \ldots, b_{X-1}$) having x bits may be generated based on a combination of an ID value ($a_0^{(1)}, a_1^{(1)}, a_2^{(1)}, \ldots, a_{N-1}^{(1)}$) of the first UE 710 and an ID value ($a_0^{(2)}, a_1^{(2)}, a_2^{(2)}, \ldots, a_{N-1}^{(2)}$) of the second UE 720 during a process of connecting the unicast session between the first UE 710 and the second UE 720. Here, for example, an SL layer-1 ID that is a physical layer ID may be generated using least significant bit (LSB) T bits in the layer-2 link ID value having x bits generated as the layer-2 link ID. That is, the layer-1 link ID may be generated as $b_0, b_1, b_2, \ldots, b_{T-1}$. That is, the layer-1 link ID may be used as a partial value of the layer-2 link ID. Therefore, X may be a value greater than T.

Also, for example, the layer-1 link ID may be generated from the layer-2 link ID value based on another method. That is, the layer-1 link ID may be a value calculated based on the layer-2 link ID value. The LSB is provided as an example only.

Figure 8:
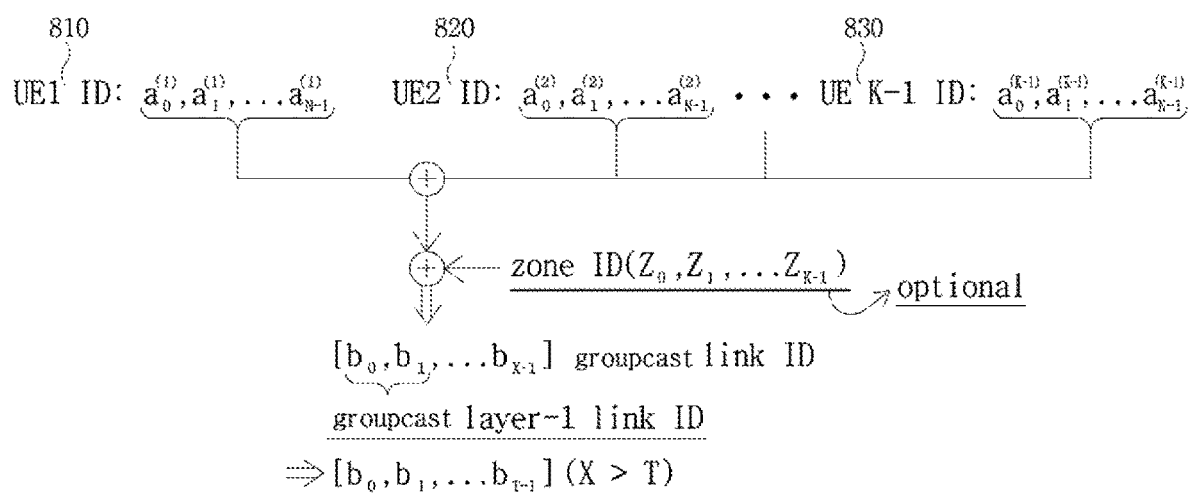
FIG. 8 illustrates an example of a method of determining a physical layer session ID for groupcast according to an embodiment of the present disclosure.

Also, for example, FIG. 8 illustrates a method of inducing a layer-1 link ID based on groupcast transmission. Here, in the case of a groupcast session, a plurality of UEs may be present in a group, which differs from unicast. Here, UEs in the group may share an ID. Here, a layer-2 link ID may be generated through a combination of UE ID values shared between UEs in the group through a groupcast session connection procedure in an upper layer. In detail, referring to FIG. 8, a first UE 810, a second UE 820, . . . , a (K−1)-th UE 830 may connect a groupcast session as a single group. Here, a layer-2 link ID value ($b_0, b_1, b_2, \ldots, b_{X-1}$) having x bits may be generated based on a combination of an ID value ($a_0^{(1)}, a_1^{(1)}, a_2^{(1)}, \ldots, a_{N-1}^{(1)}$) of the first UE 810, an ID value ($a_0^{(2)}, a_1^{(2)}, a_2^{(2)}, \ldots, a_{N-1}^{(2)}$), of the second UE 820, . . . an ID value ($a_0^{(K-1)}, a_1^{(K-1)}, a_2^{(K-1)}, \ldots, a_{N-1}^{(K-1)}$) of the (K−1)-th UE 830 during a process of connecting a groupcast session among UEs included in a group. That is, the layer-2 link ID value ($b_0, b_1, b_2, \ldots, b_{X-1}$) having x bits may be generated based on ID values of all of UEs included in the group. Here, for example, in the case of performing groupcast transmission, reliable transmission needs to be performed in a limited coverage. Accordingly, all of the UEs in the group may perform the groupcast transmission in the same zone. To this end, the layer-2 link ID value may additionally use a zone ID value based on a base station configuration and a configuration (e.g., PC5-RRC) between UEs when generating a groupcast link. A method of setting the layer-2 link ID value may be enabled or disabled optionally based on the configuration between UEs or the base station configuration. The zone ID value may be determined using a positional value of a leader UE in the group or a value set to set the group connection. Meanwhile, for example, in FIG. 8, an operator "+" may indicate a concatenation of ID bits, XOR, or a combination operation thereof.

Also, for example, the layer-2 link ID value associated with the groupcast transmission may be determined based on ID values of some UEs (or UEs) in the group. For example, the UEs included in the group may flexibly vary. Therefore, in the case of generating the layer-2 link ID value based on ID values of all of the UEs, the reliability of the layer-2 link ID value may be degraded due to flexibility in a group member. The layer-2 link ID value may be determined based on ID values of some UEs (or UEs) in the group by considering the aforementioned description. For example, a leader UE (or leader UEs) may be present in each group and each group may perform an operation based on the leader UE. The layer-2 link ID value may be determined based on the ID value of the leader UE (or leader UEs) based on the aforementioned description. However, it is provided as an example only and the present disclosure is not limited thereto.

Here, for example, an SL layer-1 ID that is a physical layer ID may be generated using LSB T bits from the layer-2 link ID value having x bits generated as the layer-2 link ID. That is, the layer-1 link ID may be generated as $b_0$, $b_1, b_2, \ldots, b_{T-1}$. That is, the layer-1 link ID may be used as a partial value of the layer-2 link ID. Therefore, in FIG. 8, X may be a value greater than T.

Also, for example, the layer-1 link ID may be generated from the layer-2 link ID value based on another method. That is, the layer-1 link ID may be a value calculated based on the layer-2 link ID value. The LSB is provided as an example only.

Also, for example, the layer-1 link ID may be generated based on a combination of layer-1 ID values with respect to each unicast and/or groupcast. For example, the layer-1 ID value may include at least one of a layer-1 destination ID, a layer-1 source ID, a HARQ process ID, a member ID in the above group, and CRC bits of associated PSCCH. Here, for example, the layer-1 destination ID may be used for filtering a packet in the physical layer. That is, the UE may use the layer-1 destination ID to verify whether a corresponding packet is allocated to the UE. Also, for example, a layer-1 new ID may be the layer-1 source ID or the HARQ process ID or the ID of the group member. Here, it is provided as an example only and the present disclosure is not limited thereto. Here, the layer-1 link ID may be generated through a combination of the aforementioned layer-1 ID values. That is, the layer-1 link ID refers to a layer-1 ID representing a single unicast or groupcast and may be determined through a combination of the aforementioned layer 1 ID values. Here, for example, a data Tx UE may indicate layer-1 destination ID, layer-1 source ID, and HARQ process ID values to a UE that performs PSFCH transmission through an SCI format. As another example, at least one of the layer-1 destination ID, layer-1 source ID, and HARQ process ID values may be shared between UEs through a session generation process. Also, for example, at least one of the layer-1 destination ID, layer-1 source ID, and HARQ process ID values may be shared between UEs in a corresponding session during an RRC connection generation process. Also, for example, CRC bits of associated PSCCH may indicate CRC bits attached to the SCI format transmitted through the PSCCH for error correction and verification as the layer-1 ID value. As another example, the layer-1 ID value may further include a layer-1 zone ID value. As another example, in the case of groupcast, the layer-1 ID value may further include the aforementioned group member ID value. Here, the layer-1 link ID may be determined based on a combination of the aforementioned layer-1 ID values.

In detail, for example, the layer-1 link ID may be $n_{ID}^{SL}$. Here, $n_{ID}^{SL}$ for unicast may be $n_{Unicast\ ID}^{SL}$. Also, $n_{ID}^{SL}$ for groupcast may be $n_{Groupcast\ ID}^{SL}$. Here, $n_{ID}^{SL}$ may be generated as shown in the following Table 13 through a combination of values of $n_{ID,1}^{SL}$, $n_{ID,2}^{SL}$, and $n_{ID,3}^{SL}$. Here, in the following Table 13, the "+" operator may indicate a concatenation of the respective ID bits, XOR, or a combination operation thereof. That is, the "+" operator represents the combination operation and the present disclosure is not limited thereto.

In detail, $n_{ID}^{SL}$ may be determined as one of the aforementioned layer-1 ID values (Alternative 1). Also, for example, $n_{ID}^{SL}$ may be determined based on a combination of two layer-1 IDs among the aforementioned layer-1 ID values (Alternative 2). Here, as described above, the combination of two layer-1 IDs may be performed through a concatenation or XOR operation of ID bits. Also, for example, the combination of two layer-1 IDs may be performed through another operation. However, it is provided as an example only and the present disclosure is not limited thereto. Also, for example, $n_{ID}^{SL}$ may be determined based on a combination of three layer-1 IDs among the aforementioned layer-1 ID values (Alternative 3). Here, as described above, the combination of two layer-1 IDs may be performed through a concatenation or XOR operation of ID bits. Also, for example, the combination of two layer-1 IDs may be performed through another operation. However, it is provided as an example only and the present disclosure is not limited thereto. As another example, $n_{ID}^{SL}$ may be determined through RRC signaling. Here, RRC signaling may refer to signaling by RRC configuration between UEs as the aforementioned PC5-RRC signaling. Here, $n_{ID}^{SL}$ may be determined based on an SL ID value provided through RRC signaling. On the other hand, if the RRC configuration is absent, $n_{ID}^{SL}$ may be determined based on the aforementioned Alternative1, Alternative 2, or Alternative 3. Here, for example, a method of determining $n_{ID}^{SL}$ in response to absence of the RRC configuration may be preset to a UE. However, it is provided as an example only and the present disclosure is not limited thereto. Here, for example, as described above, the following Table 14 and Table 15 may relate to a method of determining $n_{ID}^{SL}$ ($n_{Unicast\ ID}^{SL}$, Table 14) for unicast and a method of determining $n_{ID}^{SL}$ ($n_{Groupcast\ ID}^{SL}$, Table 15) for groupcast. Also, for example, the layer-1 link ID value may be determined based on a combination of all of the layer-1 ID values. That is, the present disclosure is not limited to generating the layer-1 link ID value based on the combination of Table 14 and Table 15.

As another example, the method of determining $n_{ID}^{SL}$ for unicast and the method of determining $n_{ID}^{SL}$ for groupcast may differ from each other. For example, since the unicast transmission is performed between two UEs, $n_{ID}^{SL}$ may be determined based on the combination of layer-1 ID values, which is described above with Alternative 1, Alternative 2, or Alternative 3. That is, the layer-1 link ID determining method may be preset to the UE and the UE may generate the layer-1 link ID based on the preset method. On the other hand, in the case of groupcast transmission, a plurality of UEs may be present in a group. Here, a number of UEs included in each group may differ. Also, a UE member included in a group may flexibly vary. By considering this aspect, $n_{ID}^{SL}$ for groupcast may be set or provided through RRC signaling similar to Alternative 4. That is, the method of determining $n_{ID}^{SL}$ for unicast and the method of determining and using $n_{ID}^{SL}$ for groupcast may differ from each other.

TABLE 13

Alternative 1 (Alt 1)
$n_{ID}^{SL}$ = Layer1 Destination ID or $n_{ID}^{SL}$ = Layer1 Source ID or $n_{ID}^{SL}$ = HARQ process ID or $n_{ID}^{SL}$ = CRC bits of associated PSCCH (combination of single SL V2X layer 1 ID)
Alternative 2 (Alt 2)
$n_{ID}^{SL} = n_{ID,1}^{SL} + n_{ID,2}^{SL}$ (combination of two SL V2X layer 1 IDs)
Alternative 3 (Alt 3)
$n_{ID}^{SL} = n_{ID,1}^{SL} + n_{ID,2}^{SL} + n_{ID,3}^{SL}$ (combination of three SL V2X layer IDs)
Alternative 4 (Alt 4)
Alternative 1 (Alt 1), Alternative 2 (Alt 2), or Alternative 3 (Alt 3) if no RRC configuration, otherwise,
SL ID value provided through PC5-RRC signaling

TABLE 14

| Unicast V2X communication | $n_{ID,1}^{SL}$ | $n_{ID,2}^{SL}$ | $n_{ID,3}^{SL}$ |
|---|---|---|---|
| $n_{Unicast\ ID}^{SL}$ | Layer-1 destination ID | — | — |
| | — | Layer-1 Source ID | — |
| | Layer-1 destination ID | Layer-1 Source ID | — |
| | Layer-1 destination ID | Layer-1 Source ID | HARQ process ID |
| | — | Layer-1 Source ID | HARQ process ID |
| | Layer-1 destination ID | — | HARQ process ID |
| | ... | ... | ... |

TABLE 15

| Groupcast V2X communication | $n_{ID,1}^{SL}$ | $n_{ID,2}^{SL}$ | $n_{ID,3}^{SL}$ |
|---|---|---|---|
| $n_{Groupcast\ ID}^{SL}$ | Layer-1 group destination ID | — | — |
| | — | Layer-1 Source ID | — |
| | Layer-1 group destination ID | Layer-1 Source ID | — |
| | Layer-1 group destination ID | Layer-1 Source ID | HARQ process ID |
| | — | Layer-1 Source ID | HARQ process ID |
| | Layer-1 group destination ID | — | HARQ process ID |
| | ... | ... | ... |

Figure 9:
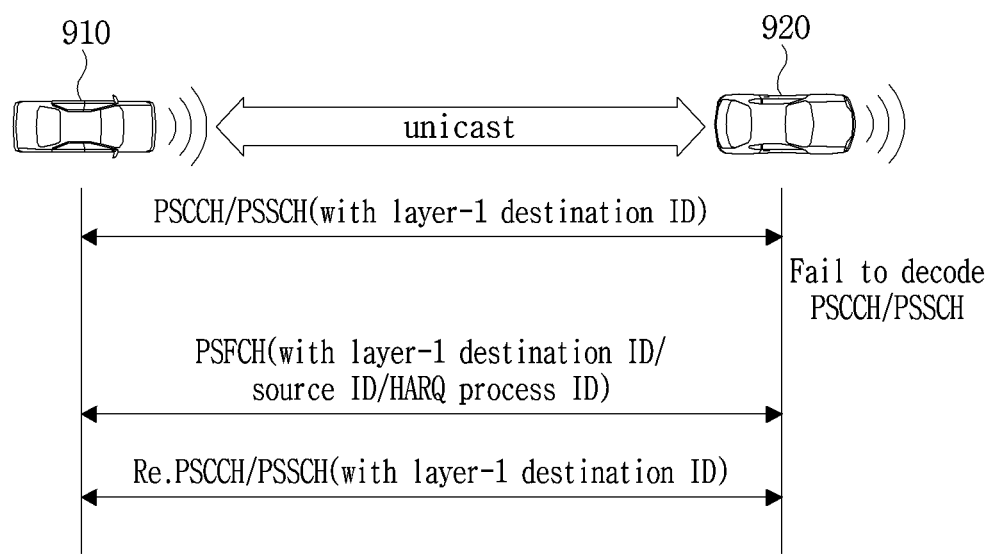
FIG. 9 illustrates an example of a method of performing sidelink communication based on a physical layer session ID according to an embodiment of the present disclosure.

Also, for example, the UE may perform an operation for meeting QoS requirements through an SL layer-1 link ID value. Here, for example, referring to FIG. 9, a first UE 910 and a second UE 920 may establish a unicast session and may perform sidelink communication. Here, an SL layer-1 link ID value used by a UE, for example, the first UE 910, transmitting a PSCCH/PSSCH may be generated based on a layer-1 destination ID. Also, an SL layer-1 link ID used by a UE, for example, the second UE 920, transmitting HARQ feedback (SFCI) may be generated based on at least one of layer-1 destination ID, source ID, group member ID, and HARQ process ID values. That is, each of the first UE 910 and the second UE 920 between which the unicast session is established may use a different SL layer-1 link ID. For example, each UE may use a different SL layer-1 link ID value based on transmission information. Also, for example, the first UE 910 and the second UE 920 may use the same SL layer-1 link ID value. However, it is provided as an example only and the present disclosure is not limited thereto. Also, FIG. 9 illustrates only a single example for generating and applying an SL layer-1 link ID value. That is, an SL layer-1 link ID value generated through another combination may be used for a different physical channel and RS. The present disclosure is not limited thereto.

Also, for example, when a layer-1 link ID for unicast and/or groupcast transmission is provided through the base station, or RRC signaling between the UEs, or the upper layer, the layer-1 link ID may be determined based on a value provided through the RRC signaling or the upper layer. That is, if a new layer-1 link ID value is set through PC5 RRC signaling, the set value may be used. On the other hand, unless the new layer-1 link ID value is set through PC5 RRC signaling, the layer-1 link ID may be generated as described above.

As described above, the layer-1 link ID may be generated as a physical layer ID. For example, in the following, a method of applying a unicast layer-1 ID (hereinafter, L1 U-ID) value or a groupcast layer-1 ID (hereinafter, L1 G-ID) value to PSFCH transmission is described. Here, it is provided as an example only. A session link ID value may be used for another physical channel and signal. That is, the present disclosure is not limited thereto. Hereinafter, a method for a feedback channel is described based on the aforementioned description.

For example, a PSFCH format based on Zadoff-Chu (ZC) sequence may be considered. Here, the ZC sequence refers to orthogonal sequence and may be one of Constant Amplitude Zero Auto-Correlation (CAZAC) sequences. Here, the PSFCH format may be determined based on the ZC sequence. For example, the ZC sequence may be generated based on a single cyclic sequence α and a base sequence thereof (n) according to the following Equation 3.

$$r_{u,v}^{(\alpha,\delta)}(n)=e^{j\alpha n}\bar{r}_{u,v}(n), 0 \leq n < M_{ZC}$$

$$\gamma_{u,v}^{(\alpha,\delta)}(n)=e^{j\alpha n}\bar{\gamma}_{u,v}(n), 0 \leq n < M_{ZC} \quad \text{[Equation 3]}$$

In Equation 3, for example, $M_{ZC}$, as a length of sequence, may be $M_{ZC}=mN_{sc}^{RB}/2^{\delta}$. Here, m denotes a value corresponding to a number of resource blocks (RBs) each to which a sequence is allocated and may be δ=0 for the PSFCH format. Also, a plurality of base sequences may be classified into a sequence group number u∈{0, 1, ..., 29} and a base sequence number v in a corresponding group. Here, a single base sequence v=0 may be set based on a ZC sequence length. Also, for example, two base sequences v=0 or 1 may be configured based on the ZC sequence length. In detail, considering a case in which the PSFCH format is mapped on a small number of PRBs as a single PRB or two PRBs and thereby used to transmit information (e.g., ACK/NACK), only a single base sequence (v=0) may be present in a sequence group. However, it is provided as an example only and the present disclosure is not limited thereto. Here, if the sequence length is less than 36 (e.g., $M_{ZC} \in \{6,12,18,24\}$), the base sequence may be determined according to the following Equation 4.

$$\bar{\gamma}_{u,v}(n)=e^{j\varphi(n)\pi/4}, 0 \leq n \leq M_{ZC}-1 \quad \text{[Equation 4]}$$

For example, in Equation 4, a value of φ(n) may be determined based on the following Table 16 (e.g., sequence length $M_{ZC}=12$). For example, another sequence length may use values shown in another table. However, it is provided as an example only and the present disclosure is not limited thereto.

TABLE 16

| u | φ(0), . . . , φ(11) | | | | | | | | | | | |
|---|---|---|---|---|---|---|---|---|---|---|---|---|
| 0 | −3 | 1 | −3 | −3 | −3 | 3 | −3 | −1 | 1 | 1 | 1 | −3 |
| 1 | −3 | 3 | 1 | −3 | 1 | 3 | −1 | −1 | 1 | 3 | 3 | 3 |
| 2 | −3 | 3 | 3 | 1 | −3 | 3 | −1 | 1 | 3 | −3 | 3 | −3 |
| 3 | −3 | −3 | −1 | 3 | 3 | 3 | −3 | 3 | −3 | 1 | −1 | −3 |
| 4 | −3 | −1 | −1 | 1 | 3 | 1 | 1 | −1 | 1 | −1 | −3 | 1 |
| 5 | −3 | −3 | 3 | 1 | −3 | −3 | −3 | −1 | 3 | −1 | 1 | 3 |
| 6 | 1 | −1 | 3 | −1 | −1 | −1 | −3 | −1 | 1 | 1 | 1 | −3 |
| 7 | −1 | −3 | 3 | −1 | −3 | −3 | −3 | −1 | 1 | −1 | 1 | −3 |
| 8 | −3 | −1 | 3 | 1 | −3 | −1 | −3 | 3 | 1 | 3 | 3 | 1 |
| 9 | −3 | −1 | −1 | −3 | −3 | −1 | −3 | 3 | 1 | 3 | −1 | −3 |
| 10 | −3 | 3 | −3 | 3 | 3 | −3 | −1 | −1 | 3 | 3 | 1 | −3 |
| 11 | −3 | −1 | −3 | −1 | −1 | −3 | 3 | 3 | −1 | −1 | 1 | −3 |
| 12 | −3 | −1 | 3 | −3 | −3 | −1 | −3 | 1 | −1 | −3 | 3 | 3 |
| 13 | −3 | 1 | −1 | −1 | 3 | 3 | −3 | −1 | −1 | −3 | −1 | −3 |
| 14 | 1 | 3 | −3 | 1 | 3 | 3 | 3 | 1 | −1 | 1 | −1 | 3 |
| 15 | −3 | 1 | 3 | −1 | −1 | −3 | −3 | −1 | −1 | 3 | 1 | −3 |
| 16 | −1 | −1 | −1 | −1 | 1 | −3 | −1 | 3 | 3 | −1 | −3 | 1 |
| 17 | −1 | 1 | 1 | −1 | 1 | 3 | 3 | −1 | −1 | −3 | 1 | −3 |
| 18 | −3 | 1 | 3 | 3 | −1 | −1 | −3 | 3 | 3 | −3 | 3 | −3 |
| 19 | −3 | −3 | 3 | −3 | −1 | 3 | 3 | 3 | −1 | −3 | 1 | −3 |
| 20 | 3 | 1 | 3 | 1 | 3 | −3 | −1 | 1 | 3 | 1 | −1 | −3 |
| 21 | −3 | 3 | 1 | 3 | −3 | 1 | 1 | 1 | 1 | 3 | −3 | 3 |
| 22 | −3 | 3 | 3 | 3 | −1 | −3 | −3 | −1 | −3 | 1 | 3 | −3 |
| 23 | 3 | −1 | −3 | 3 | −3 | −1 | 3 | 3 | 3 | −3 | −1 | −3 |
| 24 | −3 | −1 | 1 | −3 | 1 | 3 | 3 | 3 | −1 | −3 | 3 | 3 |
| 25 | −3 | 3 | 1 | −1 | 3 | 3 | −3 | 1 | −1 | 1 | −1 | 1 |
| 26 | −1 | 1 | 3 | −3 | 1 | −1 | 1 | −1 | −1 | −3 | 1 | −1 |
| 27 | −3 | −3 | 3 | 3 | 3 | −3 | −1 | 1 | −3 | 3 | 1 | −3 |
| 28 | 1 | −1 | 3 | 1 | 1 | −1 | −1 | −1 | 1 | 3 | −3 | 1 |
| 29 | −3 | 3 | −3 | 3 | −3 | −3 | 3 | −1 | −1 | 1 | 3 | −3 |

Hereinafter, a sequence group/sequence shift hopping and cyclic shift (CS) hopping capable of using the PSFCH format is described based on the aforementioned description. For example, as described above, the PSFCH format provided on a sidelink may forward only 1-bit or 2-bit HARQ-ACK (or NACK only) only.

For example, a single PSFCH format may be used to forward SFCI based on the ZC sequence. Here, to generate the ZC sequence according to the above Equation 3 and Equation 4, a sequence group u and a sequence number v in a corresponding group may need to be determined. Subsequently, a CS value may be determined and a final AC sequence may be generated. Here, referring to the above Table 16, the ZC sequence may have 30 base sequences. Therefore, in the case of generating a single base sequence, there is a need to select a sequence group number u for the base station. Here, for example, u may be determined based on the following Equation 5 and u may be hopped. Here, a sequence group hopping pattern may be $f_{gh}$ and a shift offset may be $f_{ss}$. That is, u may be changed (or hopped) based on a predetermined time or condition. Through this, the aforementioned interference situation may be reduced.

$$u=(f_{gh}+f_{ss}) \bmod 30 \quad \text{[Equation 5]}$$

Figure 10:
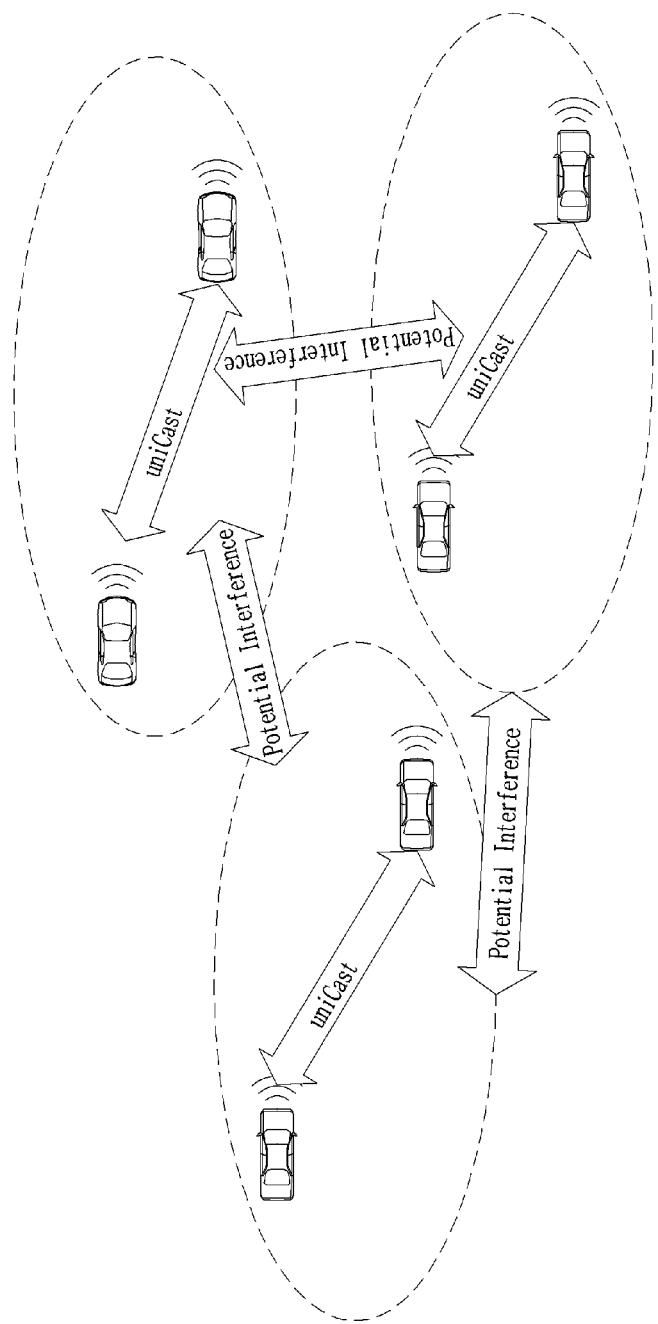
FIG. 10 illustrates an example of an environment in which a plurality of unicasts and/or groupcasts is present according to an embodiment of the present disclosure.

Here, referring to FIG. 10, in NR V2X, at least one unicast and/or groupcast session connection may be generated between a plurality of UEs. That is, in an adjacent area, each of UEs may perform a plurality of unicast and/or groupcast session connections. Here, for example, as described above, a UE may perform sidelink data transmission on a determined physical resource. Here, the determined physical resource is selected based on a sensing operation for an Rx UE to determine a Tx UE and a transmission operation may be performed. Here, for example, when a plurality of unicast and/or groupcast sessions is present between adjacent UEs, a "hidden node issue" or an ineffective resource configuration (e.g., an erroneously configured grant resource configuration) issue may occur although a resource is selected. Here, an independent AS parameter may be set for each unicast and/or groupcast session. Therefore, many collisions may occur on a sidelink resource and interference may occur based on an environment in which adjacent UEs are present.

In detail, a unicast and/or groupcast session connection may be independently performed between UEs (i.e., UEs not under control of a base station) present out of coverage and in partial coverage. Therefore, potential collision and interference may be present between different unicast, groupcast, and broadcast transmissions generated between a plurality of UEs. To meet high QoS requirements by considering the sidelink communication environment, reliable link performance needs to be provided by maximally applying an interference randomization effect in a PSFCH.

Accordingly, there is a need to perform a sequence group hopping pattern $f_{gh}$ and a sequence shift $f_{ss}$ according to the above Equation 5. For example, a parameter configuration regarding hopping for single unicast or groupcast sidelink transmission and reception may be determined between UEs involved with the corresponding unicast or groupcast transmission. Here, information regarding whether to perform the aforementioned hopping may be exchanged through RRC signaling. Also, for example, information regarding whether to perform hopping may be fixed at all times or may be determined based on a different parameter. However, it is provided as an example only and the present disclosure is not limited thereto. In detail, for example, a case in which sequence group hopping is "enabled" at all times for PSFCH transmission may be considered. On the other hand, sequence hopping (i.e., v=0) in a PSFCH sequence group may not be performed. That is, a parameter associated with the sequence group hopping may be fixed for at least PSFCH transmission. A detailed method may be represented by the following Equation 6.

$$f_{gh}=(\Sigma_{m=0}^{7} 2^m c(8(2n_{s,f}^\mu + n_{hop}^{SL})+m)) \bmod 30$$

$$f_{ss}=n_{ID}^{SL} \bmod 30$$

$$v=0$$

or, $$f_{gh}=(\Sigma_{m=0}^{7} 2^m c(8n_{s,f}^\mu + m)) \bmod 30$$

$$f_{ss}=n_{ID} \bmod 30$$

$$v=0 \quad \text{[Equation 6]}$$

Figure 11:
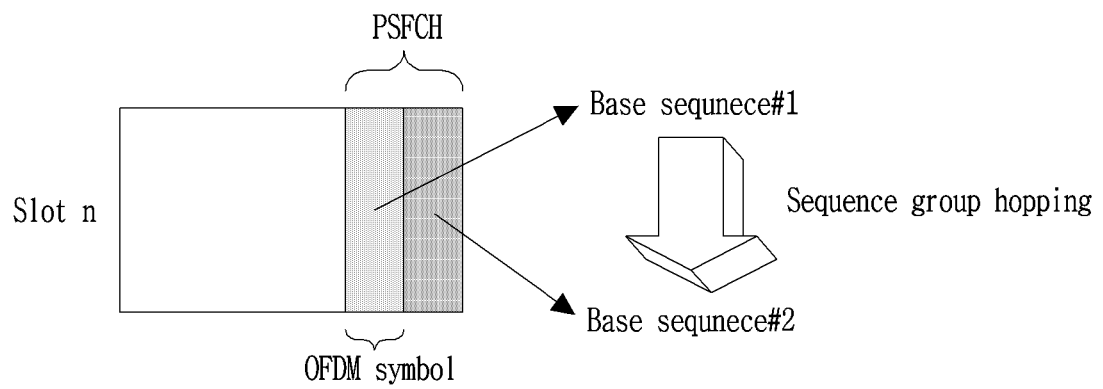
FIG. 11 illustrates an example of a method of determining a Physical Sidelink Feedback Channel (PSFCH) format according to an embodiment of the present disclosure.

Here, for example, if only a single PSFCH transmission is allowed for a single slot in NR V2X, a hopping method based on the above Equation 6 may apply. If a value of $n_{hop}^{SL}$ is assumed as 0 at all times, $f_{gh}$ may be used as equation followed by Equation 6. Here, $f_{ss}$ that is a shift offset value may be changed by the aforementioned SL layer-1 ID or hopping ID $n_{ID}$. Here, if the hopping ID is used, $n_{ID}^{SL}$ may replace $n_{ID}$ in Equation 6. Basically, $n_{ID}$ may be exchanged between UEs through a unicast/groupcast session connection procedure or a PC5-RRC connection reestablishment procedure. Otherwise, $n_{ID}^{SL}$ is used. A value of $n_{ID}$ may be provided from a UE (i.e., a UE having previously performed PSSCH data transmission) that expects to receive a PSFCH may be provided to a UE that transmits the PSFCH. Also, the value of $n_{ID}$ may be generated by a UE to have a greater number of bits based on $n_{ID}^{SL}$ and other information or a combination of random bits (e.g., 8→16 bits) and may be provided to the corresponding UE and UEs associated with the unicast/groupcast session connection. For example, $n_{ID}$ with a length of 16 bits may be generated by adding a source ID (8 bits) of $n_{ID}^{SL}$ and/or a UE member ID and a portion or all of random bits with an additional 8-bit length or other layer-1 ID information bits and may be provided to the associated UEs. In this manner, effect capable of randomizing interference between UEs belonging to different UE pairs may be provided. Also, a number of $n_{ID}$ bits is not limited to the above 16 bits and may be greater than 8 bits. In the following sequence generation methods, a method of replacing $n_{ID}^{SL}$ with $n_{ID}$ may also be considered. Therefore, a different offset value may be set for each ID. That is, a different u value may be generated. Here, referring to FIG. 11, a case in which PSFCH transmission uses two OFDM symbols and sequence group hopping is set for each OFDM symbol may be considered. Here, a value of $n_{hop}^{SL}$ may be 0 in a first OFDM symbol and a value of $n_{hop}^{SL}$ may be 1 in a second OFDM symbol. That is, if PSFCH format 0 is set to be transmitted using two OFDM symbols, SFCI may be transmitted based on a different base sequence for each symbol. Here, unless transmission is performed based on the aforementioned description, a value of $n_{hop}^{SL}$ may be 0 at all times. In this case, the PSFCH format 0 using two OFDM symbols may transmit SFCI based on the same base sequence for each symbol.

Figure 12:
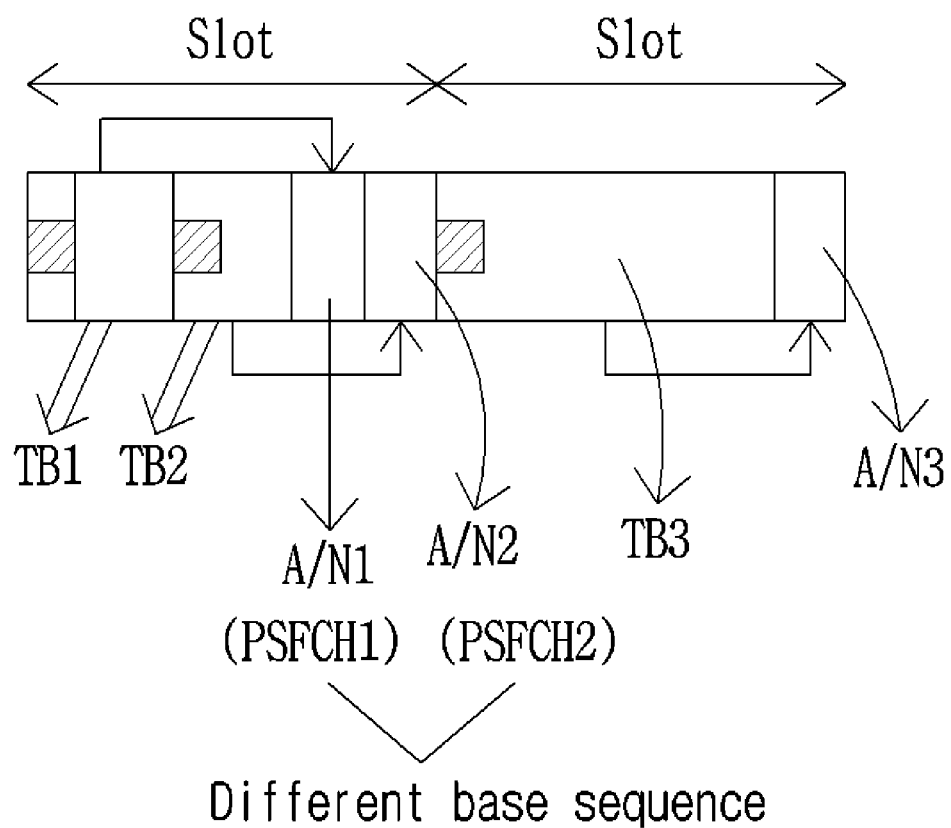
FIG. 12 illustrates an example of a method of determining a PSFCH format according to an embodiment of the present disclosure.

As another example, if at least one PSFCH transmission is allowed for at least one slot in NR V2X, a hopping method based on the following Equation 7 may apply. In detail, for example, if only a single HARQ-ACK transmission is allowed for a single slot, it may be difficult to meet requirements for delay in terms of ultra reliable low latency communication (URLLC). Based thereon, at least one PSFCH transmission may be considered in a single slot. For example, referring to FIG. 12, HARQ-ACK for each of TB 1 and TB 2 may be transmitted in a first slot. That is, each of PSFCH 1 for TB 1 and PSFCH 2 for TB 1 may be transmitted in a single slot. Here, each of the PSFCH 1 and the PSFCH 2 may generate a different base sequence value. Accordingly, if a plurality of PSFCH transmissions for NR V2X communication is configured in a single slot, OFDM symbol index/may be additionally considered. Through this, a base sequence may be generated based on a symbol unit and a different base sequence may be used based thereon. Here, a different base sequence value may be generated for each PSFCH transmission in a slot.

$f_{gh}=(\Sigma_{m=0}^{7}2^m c(8(2n_{symb}^{slot}n_{s,f}^{\mu}+l)+m)) \bmod 30$ $f_{ss}=n_{ID}^{SL} \bmod 30$ $v=0$ [Equation 7]

As another example, a parameter for a sequence group hopping method may be set based on RRC signaling. Here, if all of sequence group hopping and sequence hopping are indicated to not be performed, $f_{gh}$ and v may be 0 as represented by the following Equation 8. That is, neither group hopping nor sequence hopping may be performed.

$f_{gh}=0$ $v=0$ [Equation 8]

On the other hand, if sequence group hopping is performed based on RRC signaling and sequence hopping is not performed, it may correspond to the above case in which sequence group hopping is "enabled" at all times.

Also, for example, with respect to the aforementioned sequence hopping pattern, a random sequence c(i) for the sequence hopping pattern may be initialized based on the following Equation 9. Here, the random sequence c(i) may be initialized at each DFN start or may be initialized in a PSFCH transmission start OFDM symbol. However, it is provided as an example only and the present disclosure is not limited thereto.

$c_{init}=\lfloor n_{ID}^{SL}/30 \rfloor$ [Equation 9]

Meanwhile, $c_{init}$ may be set by considering the above SL layer-1 ID ($n_{ID}^{SL}$). Here, if $n_{ID}^{SL}$ is set to have a great value through a combination of many ID values, a larger number of sequence hopping patterns may be used in terms of sequence hopping. That is, if $n_{ID}^{SL}$ is combined with a large value by considering the combination of layer 1 ID values, the interference randomization effect may be acquired. For example, a case in which all of $n_{ID,1}^{SL}$ and $n_{ID,2}^{SL}$ are used using 8 bits in the physical layer may be considered by referring to the above Table 13 to Table 15. Here, if $n_{ID}^{SL}$ is generated based on a single ID value, $n_{ID}^{SL}$ may provide eight sequence hopping patterns. On the other hand, if $n_{ID}^{SL}$ is generated based on two ID values, $n_{ID}^{SL}$ may provide 16 sequence hopping patterns. In detail, the hopping pattern sequence may be generated through a pseudo-random sequence c(i) based on the aforementioned equation 9 and a random sequence thereof may be initialized. Therefore, as described above, the sequence hopping pattern may vary by considering the $n_{ID}^{SL}$ combination.

As another example, if sequence group hopping configuration for PSFCH is disabled, a sequence shift value and a sequence value in a group may be determined based on the aforementioned SL layer-1 ID value.

$f_{gh} = 0$ [Equation 8-1]

$f_{gh} = 0$ $f_{SS} = n_{ID}^{SL} \bmod 30$ $f_{SS} = n_{ID}^{SL} \bmod 30$ $v = c(2n_{s,f}^{\mu} + n_{hop}^{SL})$ $v = c(2n_{s,f}^{\mu} + l' + n_{hop}^{SL})$ With respect to the aforementioned sequence hopping pattern, the random sequence c(i) for the sequence hopping pattern may be initialized based on the following Equation 9-1. Here, the random sequence c(i) may be initialized at each DFN start or may be initialized in a PSFCH transmission start OFDM symbol. However, it is provided as an example only and the present disclosure is not limited thereto. Values of $n_{ID}^{SL}$ and $n_{hop}^{SL}$ may apply in the same manner as described above. For example, a value of $n_{hop}^{SL}$ may be 0 at all times. If a different v value is used for each OFDM symbol, l' is used as an OFDM symbol index in a PSFCH transmission slot.

$c_{init}=2^5 \lfloor n_{ID}^{SL}/30 \rfloor + (n_{ID}^{SL} \bmod 30)$ [Equation 9-1]

Also, for example, in the case of performing groupcast transmission, a sequence hopping method for PSFCH transmission may apply alike to the above case of performing unicast transmission based on a layer-1 link ID value for groupcast. Here, for example, $n_{ID}^{SL}$ may be $n_{ID}^{SL\_group}$, and an SL layer-1 groupcast link ID ($n_{ID}^{SL\_group}$) value may be applied to have the same sequence hopping pattern and sequence shift offset value in a group.

As another example, even in the case of having the same base sequence, interference effect may be minimized by applying different CS hopping. In detail, for example, as described above, the PSFCH format may forward SFCI based on the ZC sequence and thus, a CS hopping operation may be performed as represented by the following Equation 1012.

$$\alpha_l = \frac{2\pi}{N_{sc}^{RB}}((m_0 + m_{cs} + n_{cs}(n_{s,f}^\mu, \, l+l'))\bmod N_{sc}^{RB})$$ [Equation 10]

In Equation 10, $n_{s,f}^\mu$ denotes a slot index in a DFN or a sidelink radio frame and 1 denotes an OFDM symbol number in PSFCH transmission. For example, a first symbol for the PSFCH transmission may be l=0 and a second symbol may be l=1. Also, l' denotes an OFDM symbol index in a slot in which PSFCH transmission is present. Also, $m_0$ denotes an initial CS value. Here, the CS value may be a start offset value. For example, if a value of $m_0$ is set through the aforementioned PC5-RRC signaling, the set initial CS value $m_0$ may be used. On the other hand, unless the value of $m_0$ is set through the PC5-RRC signaling, $m_0$ may be determined based on the following Equation 11.

$$m_0 = n_{ID}^{SL} \bmod N_{SC}^{RB}$$ [Equation 11]

As another example, the aforementioned initial CS value $m_0$ may be determined through a "PSFCH resource indicator" in SCI. That is, information indicating the initial CS value $m_0$ may be transmitted using SCI included in a PSCCH transmitted from a Tx UE. Here, an Rx UE may use information acquired from the SCI for PSFCH transmission. On the other hand, unless the initial CS value $m_0$ is indicated through the "PSFCH resource indicator" in the SCI, $m_0$ may be determined according to the above Equation 11.

As described above, different groups having independent groupcast link ID values may have independent CS start values between the groups and may perform the PSFCH transmission based thereon. That is, through the aforementioned methods, even in the case of using the same base sequence, the PSFCH transmission with respect to a UE having previously performed group transmission may be performed at the same point in time using different CS values.

All of the two methods may perform PSFCH transmission with respect to a UE having previously performed group transmission at the same point in time using the same base sequence in a group and a different CS value. Here, as described above, a value of $m_0$ may be provided from a specific UE or may be determined based on a groupcast link ID value.

Also, for example, a value of $m_{cs}$ may differ based on whether a HARQ-ACK value includes 1 bit or 2 bits, and may be represented by the following Table 17 or Table 18. Here, a HARQ-ACK value may be "0: ACK, 1: NACK". Also, for example, in the case of transmitting only NACK, the HARQ-ACK value may be defined as "0:NACK, 1:DTX". However, it is provided as an example only and the present disclosure is not limited thereto. In particular, in the case of transmitting only NACK, PSFCH transmission may not be performed for ACK. On the other hand, a data Tx UE expecting PSFCH reception is unaware of whether the PSCCH is successfully received at an Rx UE. Therefore, as described above, retransmission may be determined by forwarding a DTX status to the data Tx UE. A value of $m_{cs}$ in the following Table 17 or Table 18 is not limited to values therein. Any value of [0~11] may be used for a HARQ-ACK value (e.g., Table 17: (0 or 1), Table 18: ({0,0}, {0,1}, {1,1}, {1,0}).

TABLE 17

| HARQ-ACK VAlue | 0 | 1 |
|---|---|---|
| Sequence cyclic shift | $m_{cs} = 0$ | $m_{cs} = 6$ |

TABLE 18

| HARQ-ACK Value | {0, 0} | {0, 1} | {1, 1} | {1, 0} |
|---|---|---|---|---|
| Sequence cyclic shift | $m_{cs} = 0$ | $m_{cs} = 3$ | $m_{cs} = 6$ | $m_{cs} = 9$ |

Also, for example, if a different CS hopping method is determined for each OFDM symbol, a function $n_{cs}(n_c, 1)$ may be determined as represented by the following Equation 12. Here, the function $n_{cs}(n_c, 1)$ may be determined according to $c_{init} = n_{ID}^{SL}$ using a random sequence. A method of determining $n_{ID}^{SL}$ is described above.

$$n_{cs}(n_{s,f}^\mu, l) = \Sigma_{m=0}^{7} 2^m c(8 N_{symb}^{slot} n_{s,f}^\mu + 8l + m)$$ [Equation 12]

A ZC sequence $\gamma_{u,v}^{(\alpha,\delta)}(n)$ generated based on the aforementioned description may be mapped to a physical resource according to the following Equation 13 using one or two OFDM symbols.

$$x(l, N_{sc}^{RB} + n) = \gamma_{u,v}^{(\alpha,\delta)}(n)$$ [Equation 13]

$$n = 0, 1, \ldots, N_{sc}^{RB} - 1$$

$$l = \begin{cases} 0 & \text{for single – symbol PSFCH transmission} \\ 0, 1 & \text{for double – symbol PSFCH transmission} \end{cases}$$

As another example, a PSFCH format that additionally considers a modulation symbol in addition to the aforementioned sequence-based PSFCH format may be considered. Here, the PSFCH format may be a format that multiplies the modulation symbol by the ZC sequence $\gamma_{u,v}^{(\alpha,\delta)}(n)$ and then maps to the physical resource. For example, if a number of SFCI bits is 1 bit or 2 bits (e.g., HARQ-ACK), a single modulation symbol d(0) may be generated by applying each of binary phase shift keying (BPSK) modulation and quadrature phase shift keying (QPSK) modulation. Here, the modulation symbol d(0) may be spread by a length of the ZC sequence acquired by multiplying the modulation symbol d(0) by the aforementioned ZC sequence. For example, the following Equation 14 may represent a symbol y(n) having a spread value by a sequence length corresponding to a single PRB.

$$y(n) = d(0) \cdot \gamma_{u,v}^{(\alpha,\delta)}(n)$$

$$n = 0, 1, \ldots, N_{sc}^{RB} - 1$$ [Equation 14]

Also, the symbol y(n) may be additionally multiplied by an orthogonal sequence $w_i(m)$ in a block-wise form, which may be represented by the following Equation 15.

$$z(m' N_{SC}^{RB} N_{SF,0}^{PUCCH,1} + m N_{SC}^{RB} + n) = w_i(m) \cdot y(n)$$ [Equation 15]

$$n = 0, 1, \ldots, N_{sc}^{RB} - 1$$

-continued $$m = 0, 1, \ldots, N_{SF,m'}^{PUCCH,1} - 1$$

$$m' = \begin{cases} 0 & \text{no intra-slot frequency hopping} \\ 0, 1 & \text{intra-slot frequency hopping transmission} \end{cases}$$

Here, for example, in Equation 15, an orthogonal index value i of $w_i(m)$ may be set through PC5-RRC signaling. For example, if the orthogonal sequence index value i of $w_i(m)$ is set through PC5-RRC signaling, the set orthogonal sequence index value i may be used. On the other hand, unless the orthogonal sequence index value i is set through PC5-RRC signaling, the orthogonal sequence index value i may be represented by the following Equation 16.

$$i = n_{ID}^{SL} \bmod N_{SF,m'}^{PSFCH,1} \quad \text{[Equation 16]}$$

As another example, in Equation 15, the orthogonal sequence index value i of $w_i(m)$ may be indicated through a "PSFCH resource indicator" of SCI. That is, the data Tx UE may indicate a value to the Rx UE through SCI included in the PSCCH. For example, if the orthogonal sequence index value i is indicated through the PSFCH resource indicator, the set orthogonal sequence index value i may be used. On the other hand, unless the orthogonal sequence index value i is set by the PSFCH resource indicator, the orthogonal sequence index value i may be represented by the following Equation 16.

That is, if information about a selection on the CS value of the ZC sequence and a selection on the orthogonal sequence index value is provided from the Tx UE to the Rx UE through the PSCCH, or if the information is preset through PC5-RRC signaling, the PSFCH transmission may be performed based on the indicated value.

On the other hand, if pre-signaling is absent, the CS value of the ZC sequence and the orthogonal sequence index value may be selected based on a value of $n_{ID}^{SL}$ as the above-defined physical layer ID value.

As another example, a PSFCH resource index may be determined in a different form based on $n_{ID}^{SL}$. Here, the PSFCH resource index may indicate the CS value of the ZC sequence and the orthogonal sequence index value. Here, a mapping relationship among the PSFCH resource index, the CS value of the ZC sequence, and the orthogonal sequence index value may be preset through PC5-RRC signaling and may be indicated based thereon. Meanwhile, for example, $N_{SF,m}^{PSFCH,1}$ may be a length of an orthogonal sequence. Here, the orthogonal sequence may be determined based on the above Equation 15 and Equation 16 according to $N_{SF,m}^{PSFCH,1}$ and the orthogonal sequence index value by referring to the following Table 20.

In detail, the length of the orthogonal sequence may be determined based on the following Table 19 and Table 20 according to a number of OFDM symbols ($N_{symb}^{PSFCH,1}$) to which the PSFCH (SCFI) is allocated aside from a number of OFDM symbols to which a demodulation synchronization signal (DMRS) is allocated and whether intra-slot hopping is set. Here, $N_{symb}^{PSFCH,1}$ denotes a total number of OFDM symbols to which an RS and SFCI are allocated. For example, referring to FIG. 13, a value of $N_{symb}^{PSFCH,1}$ is 4 and may be set differently depending on whether intra-slot hopping is set.

Figure 13:
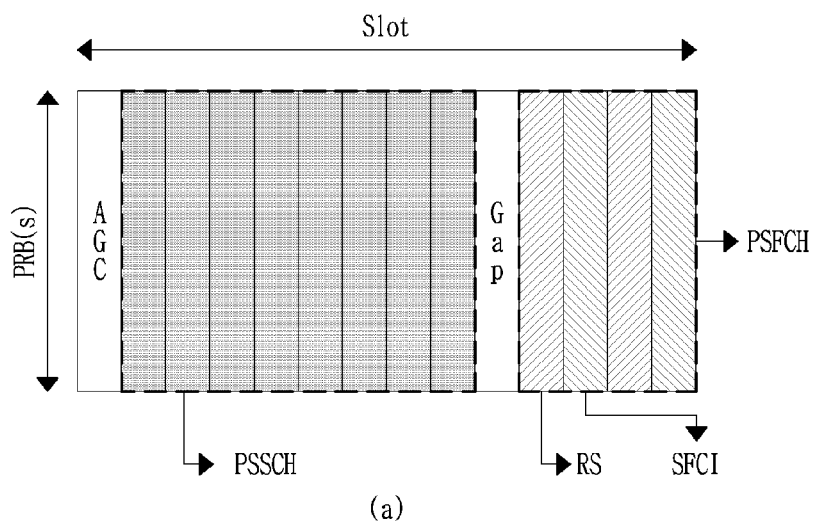
FIG. 13 illustrates an example of a method of determining a PSFCH format according to an embodiment of the present disclosure.
Figure 13:
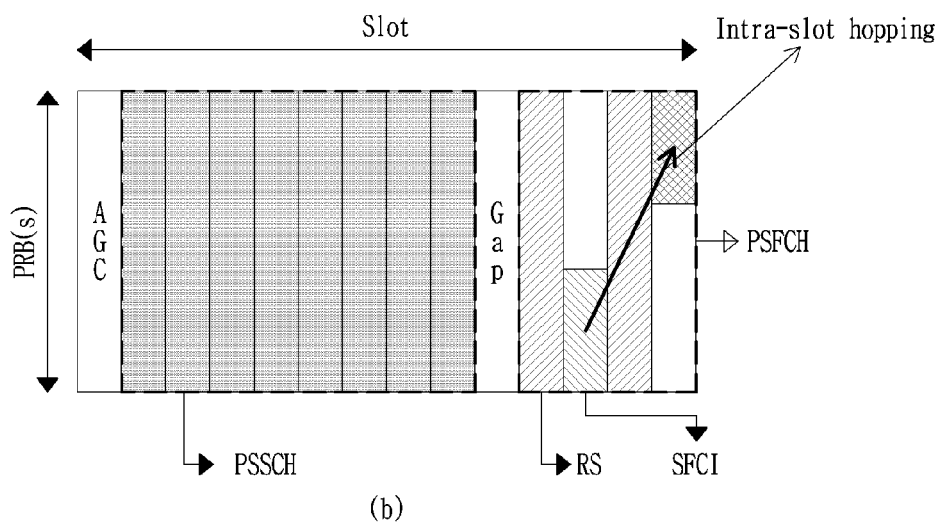

For example, referring to (a) of FIG. 13, unless intra-slot hopping is set, $N_{SF,m'}^{PSFCH,1}=2$ (m'=0). On the other hand, referring to (b) of FIG. 13, if intra-slot hopping is set, $N_{SF,m'}^{PSFCH,1}=3$ for m=0 and $N_{SF,m'}^{PSFCH,1}=4$ for m'=1. That is, different values may be applied. In particular, if intra-slot hopping is performed, each of front m'=0 and rear m'=1 in a slot may be multiplied by the orthogonal sequence. In detail, referring to (b) of FIG. 13, the orthogonal sequence corresponding to $N_{SF,m'}^{PSFCH,1}=1$ may be used for all of m'=0 and m'=1. Here, by referring to the following Table 20, a value of Ø may be 0 and a final orthogonal sequence may be generated. Also, for example, whether RRC signaling is provided for a start PRB of intra-slot hopping may be considered. Here, unless RRC signaling is provided for the start PRB of intra-slot hopping, the start PRB may be a lowest PRB index value to which a data channel is allocated. Here, a second hop for a subsequent end PRB that performs hopping may correspond to a highest PRV index value to which a data channel is allocated. As another example, indices of a start PRB and an end PRB in a resource area to which a data channel is allocated may be determined through another method for different hopping based on the aforementioned SL ID value. It is provided as an example only and the present disclosure is not limited thereto.

TABLE 19

| | $N_{SF,m'}^{PSFCH,1}$ | | |
|---|---|---|---|
| PSFCH length, | No intra-slot hopping | Intra-slot hopping | |
| $N_{symb}^{PSFCH,1}$ | m' = 0 | m' = 0 | m' = 1 |
| 4 | 2 | 1 | 1 |
| 5 | 2 | 1 | 1 |
| 6 | 3 | 1 | 2 |
| 7 | 3 | 1 | 2 |
| 8 | 4 | 2 | 2 |
| 9 | 4 | 2 | 2 |
| 10 | 5 | 2 | 3 |
| 11 | 5 | 2 | 3 |
| 12 | 6 | 3 | 3 |
| 13 | 6 | 3 | 3 |
| 14 | 7 | 3 | 4 |

TABLE 20

| | Ø | | | | | | |
|---|---|---|---|---|---|---|---|
| $N_{SF,m}^{PSFCH,1}$ | i = 0 | i = 1 | i = 2 | i = 3 | i = 4 | i = 5 | i = 6 |
| 1 | [0] | — | — | — | — | — | — |
| 2 | [0 0] | [0 1] | — | — | — | — | — |
| 3 | [0 0 0] | [0 1 2] | [0 2 1] | — | — | — | — |
| 4 | [0 0 0 0] | [0 2 0 2] | [0 0 2 2] | [0 2 2 0] | — | — | — |
| 5 | [0 0 0 0 0] | [0 1 2 3 4] | [0 2 4 1 3] | [0 3 1 4 2] | [0 4 3 2 1] | — | — |
| 6 | [0 0 0 0 0 0] | [0 1 2 3 4 5] | [0 2 4 0 2 4] | [0 3 0 3 0 3] | [0 4 2 0 4 2] | [0 5 4 3 2 1] | — |
| 7 | [0 0 0 0 0 0 0] | [0 1 2 3 4 5 6] | [0 2 4 6 1 3 5] | [0 3 6 2 5 1 4] | [0 4 1 5 2 6 3] | [0 5 3 1 6 4 2] | [0 6 5 4 3 2 1] |

Also, for example, a PSFCH structure for transmitting feedback information based on a PSFCH format may be set based on a sidelink data channel structure. For example, an original SFCI bit (e.g., of a PSFCH format) may perform a scrambling procedure after channel coding and rate matching. Here, in the case of a single layer transmission, q may be 0 and a coded SCFI bit by $b^{(q)}(0), \ldots, b^{(q)}(M_{bit}^{(q)}-1)$ may be transmitted on the PSFCH by a length of $M_{bit}^{(q)}$. Here, a size of $M_{bit}^{(q)}$ may be determined based on available resources (a number of resource elements (REs) and modulation scheme) corresponding to a fixed number of PRBs. Here, the fixed number of PRBs for PSFCH transmission may be preset based on a size of original SCFI or may be set based on RRC signaling. Also, for example, scrambling for the PSFCH may be determined based on the following Equation 17. Here, the scrambling sequence $c^{(q)}(i)$ may be generated based on a random sequence and a corresponding initialization value may be represented by the following Equation 18. Here, for example, in Equation 18, a value of $n_{ID}^{SL}$ may be an ID used in the physical layer as the aforementioned SL ID value.

$$\tilde{b}^{(q)}(i)=(b^{(q)}(i)+c^{(q)}(i)) \bmod 2 \qquad [\text{Equation 17}]$$

$$c_{init}=n_{ID}^{SL} \cdot 2^{15}+n_{s,f}^{\mu} \cdot 2^{10}+1008 \qquad [\text{Equation 18}]$$

Also, for example, QPSK may be used for PSFCH modulation. Also, layer mapping and precoding may be transmitted based on a waveform (e.g., CP-OFDM or SC-FDMA) finally determined with the assumption of a single layer and a single antenna transmission.

Here, for example, the aforementioned various types of PSFCH formats may be preset to a UE. Also, for example, the various types of PSFCH formats may be provided between UEs associated with unicast/groupcast through PC5-RRC signaling. However, it is provided as an example only and the present disclosure is not limited thereto. Here, for example, if a PSFCH resource configuration of a single NR V2X UE is set and determined based on PC5-RRC signaling in unicast or groupcast transmission, a portion of or all of information included in the following Table 21 may be provided through RRC signaling. However, it is provided as an example only and the present disclosure is not limited thereto.

TABLE 21

Figure 14:
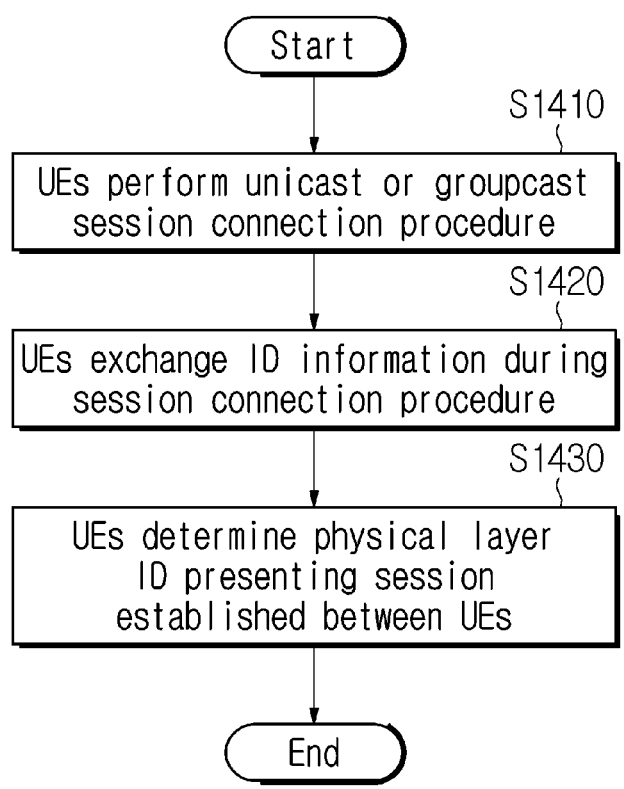
FIG. 14 illustrates an example of a method of determining a physical layer session ID according to an example embodiment of the present disclosure.

PSFCH resource index
Start OFDM symbol and duration
Information for start PRB index intra-slot hopping: end PRB index with hopping PRB gap information
PSFCH format index (e.g., PSFCH format 0, or 1)
SL layer-1 link ID FIG. 14 is a flowchart illustrating an example of a method of determining a physical layer session ID. Referring to FIG. 14, in operation S1410, UEs may perform a unicast or groupcast session connection procedure. Here, as described above with reference to FIGS. 1 to 13, two UEs may perform a session connection through the unicast session connection procedure. Also, for example, a plurality of UEs may perform a groupcast session connection based on the groupcast session connection procedure. Here, as described above, in operation S1420, the UEs may exchange ID information during the session connection procedure. In operation S1430, the UEs may determine a physical layer ID representing a session established between the UEs based on the exchanged ID information. For example, the physical layer ID may be a layer-1 link ID induced based on a layer-2 link ID value for identifying an upper layer session. Also, for example, as described above, the layer-1 link ID may be generated based on a combination of layer-1 ID values for each of unicast and/or groupcast. For example, layer-1 ID values may include at least one of a layer-1 destination ID, a layer-1 source ID, a HARQ process ID, and CRC bits of associated PSCCH.

Figure 15:
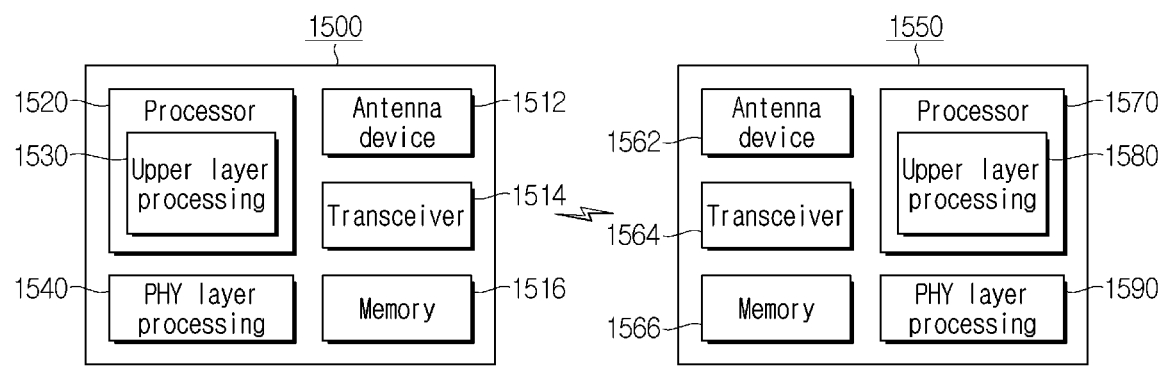
FIG. 15 illustrates an example of a configuration of a base station device and a terminal device according to an example embodiment of the present disclosure.

FIG. 15 illustrates an example of a base station device and a terminal device.

Referring to FIG. 15, a base station device 1500 may include a processor 1520, an antenna device 1512, a transceiver 1514, and a memory 1516.

The processor 1520 may perform baseband-related signal processing and may include an upper layer processing 1530 and a physical layer processing 1540. The upper layer processing 1530 may process an operation of a Medium Access Control (MAC) layer, a Radio Resource Control (RRC) layer, or more upper layers. The physical layer processing 1540 may process an operation (e.g., uplink received signal processing and downlink transmission signal processing) of a physical (PHY) layer. The processor 1520 may control the overall operation of the base station device 1500 in addition to performing the baseband-related signal processing.

The antenna device 1512 may include at least one physical antenna. If the antenna device 1512 includes a plurality of antennas, multiple input multiple output (MIMO) transmission and reception may be supported. The transceiver 1514 may include a radio frequency (RF) transmitter and an RF receiver. The memory 1516 may store operation processed information of the processor 1520 and software, an operating system (OS), an application, etc., associated with an operation of the base station device 1500, and may include a component such as a buffer.

The processor 1520 of the base station device 1500 may be configured to implement an operation of a base station in the embodiments disclosed herein.

The terminal device 1550 may include a processor 1570, an antenna device 1562, a transceiver 1564, and a memory 1566. Meanwhile, for example, communication between terminal devices may be performed based on sidelink communication. That is, each terminal device 1550 performing sidelink communication herein refers to a device that performs sidelink communication with another terminal device 1550 as well as the base station device 1500. It is provided as an example only.

The processor 1570 may perform baseband-related signal processing and may include an upper layer processing 1580 and a physical layer processing 1590. The upper layer processing 1580 may process an operation of a MAC layer, an RRC layer, or more upper layers. The physical layer processing 1590 may process an operation (e.g., downlink received signal processing and uplink transmission signal processing) of a PHY layer. The processor 1570 may control the overall operation of the terminal device 1550 in addition to performing the baseband-related signal processing.

The antenna device 1562 may include at least one physical antenna. If the antenna device 1562 includes a plurality of antennas, MIMO transmission and reception may be supported. The transceiver 1564 may include an RF transmitter and an RF receiver. The memory 1566 may store operation processed information of the processor 1570 and software, an OS, an application, etc., associated with an operation of the terminal device 1550, and may include a component such as a buffer.

The processor 1570 of the terminal device 1550 may be configured to implement an operation of a terminal in the embodiments described herein.

Also, for example, the processor 1570 of the terminal device 1550 may perform sidelink communication with another terminal device. Here, for example, the processor 1570 of the terminal device 1550 may establish a groupcast and/or unicast session with another terminal device 1550. Also, for example, the processor 1570 of the terminal device 1550 may determine a physical layer session ID based on the established session. Also, for example, the processor 1570 of the terminal device 1550 may perform operations for meeting QoS requirements based on the determined physical layer session ID, which is described above.

The various examples herein are to explain the representative aspects of the present disclosure instead of describing all the possible combinations and matters described in the various examples may independently apply or may apply through at least two combinations thereof.

Also, various examples of the present disclosure may be implemented by hardware, firmware, software, or combination thereof. In the case of implementation by hardware, the examples may be implemented by one or more application-specific integrated circuits (ASICs), digital signal processors (DSPs), digital signal processing devices (DSPDs), programmable logic devices (PLDs), field programmable gate arrays (FPGAs), general processors, controllers, microcontrollers, microprocessors, etc.

The scope of the present disclosure includes software or machine-executable instructions (e.g., OS, application, firmware, program, etc.) such that operations of the method of the various examples may be executed on an apparatus or a computer, and a non-transitory computer-readable medium storing such software or instructions to be executable on an apparatus or a computer.

What is claimed is:

1. A method comprising:
    receiving, by a first wireless user device, a radio resource control (RRC) signaling configuration indicating a sidelink (SL) identifier (ID) value;
    determining, based on a least significant bit (LSB) part of a layer-2 ID, a layer-1 ID for SL communication, wherein layer-1 is a physical layer of a wireless communication system, wherein layer-2 is an upper layer of the physical layer, and wherein the upper layer comprises a medium access control (MAC) layer;
    receiving, from a second wireless user device and based on the layer-1 ID, at least one data packet via a physical sidelink shared channel (PSSCH);
    generating an orthogonal sequence for a physical sidelink feedback channel (PSFCH) format, based on:
        the SL ID value; and
        a cyclic hopping parameter; and
    transmitting, to the second wireless user device and based on the orthogonal sequence, SL feedback control information (SFCI) via a PSFCH.

2. The method of claim 1, wherein the layer-2 ID is used to identify at least one of: a unicast layer-2 link; or a groupcast layer-2 link.

3. The method of claim 1, wherein the layer-2 ID comprises at least one of: a layer-2 source ID; or a layer-2 destination ID, and
    wherein the layer-1 ID comprises at least one off a layer-1 source ID; or a layer-1 destination ID.

4. The method of claim 3, further comprising:
    receiving, from the second wireless user device, a physical sidelink control channel (PSCCH) transmission indicating control information associated with a scheduling of the PSSCH;
    receiving, from the second wireless user device, sidelink control information (SCI), wherein an SCI format of the SCI indicates the layer-1 source ID and the layer-1 destination ID; and
    determining, based on the receiving the at least one data packet via the PSSCH, at least one sidelink hybrid automatic repeat request (HARQ) feedback bit for PFSCH transmission.

5. The method of claim 1, wherein an initialization value Cinit for generating the orthogonal sequence is determined based on the SL ID value.

6. The method of claim 1, wherein the SL-layer-1 ID is used for filtering of packets at a physical layer of the first wireless user device, and
    wherein the layer-1 ID consists of T bits, and the layer-2 ID consists of X bits, where X is greater than T.

7. The method of claim 1, wherein the SFCI comprises a SL hybrid automatic repeat request (HARQ) feedback information associated with the PSSCH.

8. The method of claim 1, wherein the orthogonal sequence is generated further based on the cyclic hopping parameter, a group number of a sequence group of the orthogonal sequence, and a sequence number of the sequence group of the orthogonal sequence.

9. The method of claim 8, wherein the group number of the sequence group of the orthogonal sequence is determined based on the SL ID value.

10. The method of claim 9, wherein the group number of the sequence group is determined based on $n_{ID}^{SL}$ mod 30, where the SL ID value is $n_{ID}^{SL}$, and
    wherein the sequence number within the sequence group is set to zero.

11. The method of claim 1, wherein the cyclic hopping parameter is determined based on a value that is determined based on a groupcast link ID.

12. The method of claim 11, wherein the SL-layer-1 ID comprises at least one of: a layer-1 source ID; or a layer-1 destination ID, and
    wherein the groupcast link ID is based on at least one of:
        the layer-1 source ID; or
        a group member ID within a group.

13. A method comprising:
    receiving, by a first wireless user device, a radio resource control (RRC) message indicating a sidelink (SL) identifier (ID) value;
    determining, based on a least significant bit (LSB) part of a layer-2 source ID, a layer-1 source ID, wherein layer-1 is a physical layer of a wireless communication system, wherein layer-2 is an upper layer of the physical layer, and wherein the upper layer comprises a medium access control (MAC) layer;
    determining, based on a least significant bit (LSB) part of a layer-2 destination ID, a layer-1 destination ID;
    receiving, from a second wireless user device and based on the layer-1 destination ID, at least one data packet via a physical sidelink shared channel (PSSCH);
    generating an orthogonal sequence for a physical sidelink feedback channel (PSFCH) format, based on:
        the SL ID value; and
        the layer-1 source ID; and
    transmitting, to the second wireless user device and based on the orthogonal sequence, SL feedback control information (SFCI) via a PSFCH.

14. The method of claim 13, wherein the orthogonal sequence is generated further based on a cyclic hopping parameter, a group number of a sequence group of the orthogonal sequence, and a sequence number of the sequence group of the orthogonal sequence.

15. The method of claim 14, wherein the group number of the sequence group is determined based on $n_{ID}^{SL}$ mod 30, where the SL ID value is $n_{ID}^{SL}$, and
wherein the sequence number within the sequence group is set to zero.

16. The method of claim 14, wherein the cyclic hopping parameter is determined based on a value that is determined based on the layer-1 source ID.

17. The method of claim 13, further comprising:
receiving, from the second wireless user device, a physical sidelink control channel (PSCCH) transmission indicating control information associated with a scheduling of the PSSCH;
receiving, from the second wireless user device, sidelink control information (SCI), wherein an SCI format of the SCI indicates the layer-1 source ID and the layer-1 destination ID; and
determining, based on the receiving the at least one data packet via the PSSCH, at least one sidelink hybrid automatic repeat request (HARQ) feedback bit for PFSCH transmission.

18. The method of claim 13, wherein an initialization value Cinit of the orthogonal sequence is determined based on the SL ID value.

19. The method of claim 13, wherein the SFCI comprises a SL hybrid automatic repeat request (HARQ) feedback information associated with the at least one data packet transmitted via the PSSCH.

20. The method of claim 13, wherein a sequence group number of the orthogonal sequence is determined based on the SL ID value.

* * * * *